(12) United States Patent
Ahn et al.

(10) Patent No.: US 8,957,925 B2
(45) Date of Patent: Feb. 17, 2015

(54) METHOD OF DRIVING A DISPLAY PANEL AND DISPLAY APPARATUS FOR PERFORMING THE SAME

(75) Inventors: Ik-Huyn Ahn, Hwaseong-si (KR); Seon-Ki Kim, Anyang-si (KR); Se-Huhn Hur, Yongin-si (KR); Jun-Pyo Lee, Asan-si (KR); Bong-Im Park, Asan-si (KR); Ho-Seok Son, Incheon (KR)

(73) Assignee: Samsung Display Co, Ltd., Yongin, Gyeonggi-Do (KP)

( * ) Notice: Subject to any disclaimer, the term of this patent is extended or adjusted under 35 U.S.C. 154(b) by 148 days.

(21) Appl. No.: 13/611,197

(22) Filed: Sep. 12, 2012

(65) Prior Publication Data

US 2013/0082999 A1   Apr. 4, 2013

(30) Foreign Application Priority Data

Sep. 30, 2011   (KR) .................. 10-2011-0099515

(51) Int. Cl.
*G09G 3/00* (2006.01)
*H04N 13/00* (2006.01)
*H04N 13/04* (2006.01)

(52) U.S. Cl.
CPC ........... *G09G 3/003* (2013.01); *H04N 13/0497* (2013.01); *H04N 13/0434* (2013.01); *H04N 13/0438* (2013.01); *G09G 2310/0205* (2013.01); *G09G 2310/0213* (2013.01); *G09G 2310/0218* (2013.01); *G09G 2320/0209* (2013.01); *G09G 2320/0233* (2013.01); *G09G 2310/061* (2013.01)
USPC .............................. 345/691; 345/87; 348/51

(58) Field of Classification Search
CPC .......... G09G 3/003; G09G 2310/0205; G09G 2310/0213; G09G 2310/061; G09G 2320/0209; G09G 2320/0238; G09G 2320/0233; G09G 2310/0218; H04N 13/0497; H04N 13/0434; H04N 13/0438
USPC .............. 345/6–8, 87–102, 690, 691; 348/42, 348/51–58, E13.026, E13.059
See application file for complete search history.

(56) References Cited

U.S. PATENT DOCUMENTS

| | | | |
|---|---|---|---|
| 2006/0244705 A1* | 11/2006 | Song et al. ...................... | 345/98 |
| 2008/0284801 A1 | 11/2008 | Brigham et al. | |
| 2010/0033462 A1 | 2/2010 | Hasegawa et al. | |
| 2010/0091207 A1 | 4/2010 | Hasegawa et al. | |

(Continued)

FOREIGN PATENT DOCUMENTS

| | | |
|---|---|---|
| JP | 2006284716 | 10/2006 |
| KR | 1020100056361 | 5/2010 |
| WO | 2011077718 | 6/2011 |

OTHER PUBLICATIONS

European Search Report corresponding to European Patent Appln. 12184412.0-1903 dated Jan. 7, 2013.

*Primary Examiner* — Alexander Eisen
*Assistant Examiner* — Abhishek Sarma
(74) *Attorney, Agent, or Firm* — F. Chau & Associates, LLC

(57) ABSTRACT

A method of driving a display panel includes outputting a data voltage of three-dimensional ("3D") image data included in a left-eye data frame and a right-eye data frame to the display panel along a scanning direction of a first direction during a first period, blocking the data voltage from being provided to the display panel during a second period and outputting a black data voltage to the display panel during a third period that is less than the first period.

31 Claims, 12 Drawing Sheets

(56) References Cited

U.S. PATENT DOCUMENTS

| | | |
|---|---|---|
| 2011/0007140 A1 | 1/2011 | Nakahata et al. |
| 2011/0032342 A1 | 2/2011 | Kato et al. |
| 2011/0063533 A1* | 3/2011 | Kim et al. .................. 349/15 |
| 2011/0090320 A1* | 4/2011 | Tsuchida .................... 348/51 |
| 2011/0096146 A1* | 4/2011 | Hulyalkar et al. ........... 348/43 |
| 2011/0109733 A1 | 5/2011 | Kim et al. |
| 2011/0169871 A1* | 7/2011 | Suzuki et al. ................ 345/690 |
| 2011/0234776 A1 | 9/2011 | Hanari |
| 2011/0279490 A1* | 11/2011 | Lee et al. .................... 345/691 |
| 2011/0279749 A1* | 11/2011 | Erinjippurath et al. ......... 349/61 |
| 2011/0292184 A1* | 12/2011 | de Greef ..................... 348/51 |
| 2011/0304658 A1* | 12/2011 | Park et al. .................. 345/691 |
| 2012/0033053 A1* | 2/2012 | Park et al. .................. 348/51 |
| 2012/0182405 A1* | 7/2012 | Huang et al. ................. 348/54 |

\* cited by examiner

METHOD OF DRIVING A DISPLAY PANEL AND DISPLAY APPARATUS FOR PERFORMING THE SAME

PRIORITY STATEMENT

This application claims priority under 35 U.S.C. §119 to Korean Patent Application No. 10-2011-0099515, filed on Sep. 30, 2011, in the Korean Intellectual Property Office (KIPO), the disclosure of which is incorporated by reference in its entirety.

1. TECHNICAL FIELD

Exemplary embodiments of the present invention relate to a method of driving a display panel and a display apparatus for performing the same. More particularly, exemplary embodiments of the present invention relate to a method of driving a display panel, which may increase a luminance of a three-dimensional ("3D") image and a display apparatus for performing the same.

2. DISCUSSION OF RELATED ART

A liquid crystal display ("LCD") can be used to display a 3D image using the principle of binocular parallax. For example, since our eyes are spaced apart from each other, images viewed at different angles may be perceived by an observer as a stereoscopic image. A display apparatus that enables stereoscopic images to be displayed may be referred to as a stereoscopic image display apparatus.

A stereoscopic image display apparatus may be classified into a stereoscopic type with an extra spectacle and an auto-stereoscopic type without the extra spectacle. The stereoscopic type includes a passive polarized glasses method with a polarized filter having a different polarized axis according to each eye, and an active shutter glasses method. In the active shutter glasses method, a left-eye frame image and a right-eye frame image are time-divided to be periodically displayed, and a pair of glasses is used to view the displayed images. The glasses include a left-eye shutter and a right-eye shutter, which are sequentially opened or closed in synchronization with the periods.

The polarized glasses method uses the polarized filter to divide the 3D image into a left-eye frame image and a right-eye frame image, which may cause a luminance of the 3D image to be decreased. In addition, in the shutter glasses method, a liquid crystal ("LC") response time may have an affect on a crosstalk between the left-eye frame image and the right-eye frame. However, it can be difficult to improve the LC response time. A backlight unit may be driven with a global blinking method to improve crosstalk between the left-eye frame image and the right-eye frame. However, the global blinking method may decrease the luminance of the 3D image.

SUMMARY

At least one exemplary embodiment of the present invention provides a method of driving a display panel to increase a luminance of a 3D image.

At least one exemplary embodiment of the present invention provides a display apparatus for performing the method of driving the display panel.

According to an exemplary embodiment of the invention, a method of driving a display panel includes outputting a data voltage of three-dimensional ("3D") image data included in a left-eye data frame and a right-eye data frame to the display panel along a scanning direction of a first direction during a first period, blocking the data voltage from being provided to the display panel during a second period, and outputting a black data voltage to the display panel during a third period less than the first period.

In an exemplary embodiment, the data voltage of the 3D image data is maintained during a holding period before which the black data voltage is output to the display panel, and the holding period is gradually decreased along the scanning direction.

In an exemplary embodiment, the method further includes providing a light to the display panel during an image period during which an image corresponding to the 3D image data is displayed on the display panel and blocking the light from the display panel during a block period during which a black image corresponding to the black data voltage is displayed on the display panel, wherein the image period includes the holding period.

In an exemplary embodiment, a period during which the black data voltage is provided to the display panel is gradually increased along the scanning direction.

In an exemplary embodiment, the method further includes correcting the 3D image data using a plurality of look-up tables ("LUTs") and each LUT is preset respectively corresponding to one of a plurality of distinct regions of the display panel arranged along the scanning direction.

In an exemplary embodiment, the method further includes outputting the data voltage of the 3D image data to the display panel along the scanning direction of a second direction opposite to the first direction during a fourth period, blocking the data voltage from being provided to the display panel during a fifth period and outputting the black data voltage to the display panel during a sixth period less than the fourth period.

In an exemplary embodiment, outputting the data voltage of the 3D image data includes sequentially outputting a gate signal having a first pulse to a plurality of gate lines included in the display panel along the scanning direction.

In an exemplary embodiment, outputting the black data voltage to the display panel includes sequentially outputting a gate signal having a second pulse of a width less than or equal to that of the first pulse to the gate lines along the scanning direction.

In an exemplary embodiment, outputting the black data voltage to the display panel includes outputting a gate signal having a third pulse to the gate lines at the same time.

According to an exemplary embodiment of the invention, a method of driving a display panel includes outputting a data voltage of a first left-eye data frame or a first right-eye data frame to the display panel during a first period, sequentially outputting a gate signal having a first pulse to a plurality of gate lines included in the display panel, blocking the data voltage from being output to the display panel during a second period, outputting a data voltage of a second left-eye data frame or a second right-eye data frame that repeats the first left-eye data frame or the first right-eye data frame to the display panel during a third period less than the first period, and sequentially outputting a gate signal having a second pulse to the gate lines.

According to an exemplary embodiment of the invention, a display apparatus includes a display panel and a data driving part. The data driving part outputs a data voltage of three-dimensional (3D) image data included in a left-eye data frame and a right-eye data frame to the display panel along a scanning direction of a first direction during a first period, blocks the data voltage from being provided to the display panel during a second period, and outputs a black data voltage to the display panel during a third period less than the first period.

In an exemplary embodiment, the data voltage of the 3D image data is maintained during a holding period before which the black data voltage is output to the display panel, and the holding period may be gradually decreased along the scanning direction.

In an exemplary embodiment, the display apparatus further includes a light source part providing a light to the display panel during an image period in which an image corresponding to the 3D image data is displayed on the display panel, and blocking the light from the display panel during a block period in which a black image corresponding to the black data voltage is displayed on the display panel, wherein the image period includes the holding period.

In an exemplary embodiment, the display apparatus further includes a data correcting part correcting the 3D image data using a plurality of look-up tables ("LUTs") preset corresponding to one of a plurality of distinct regions of the display panel and arranged along the scanning direction.

In an exemplary embodiment, the data driving part outputs the data voltage of the 3D image data to the display panel along the scanning direction of a second direction opposite to the first direction during a fourth period, blocks the data voltage from being provided to the display panel during a fifth period, and outputs the black data voltage to the display panel during a sixth period less than the fourth period.

In an exemplary embodiment, the display apparatus further includes a gate driving part sequentially outputting a gate signal having a first pulse to a plurality of gate lines included in the display panel along the scanning direction during the first period.

In an exemplary embodiment, the gate driving part sequentially outputs a gate signal having a second pulse of a width less than or equal to that of the first pulse to the gate lines along the scanning direction during the third period.

In an exemplary embodiment, the gate driving part outputs a gate signal having a third pulse to the gate lines at the same time during the third period.

According to an exemplary embodiment of the invention, a display apparatus includes a display panel. The display panel displays one of a left-eye frame image, a right-eye frame image and a refresh frame image (e.g., on an entire area). Left-eye frame image data corresponding to the left-eye frame image or right-eye frame image data corresponding to the right-eye frame image are provided to the display panel during a first period, and refresh frame image data corresponding to the refresh frame image are provided to the display panel during a second period less than the first period.

In an exemplary embodiment, the display apparatus further includes a glasses part including a left-eye part transmitting the left-eye frame image and blocking the right-eye frame image, and a right-eye part transmitting the right-eye frame image and blocking the left-eye frame image.

In an exemplary embodiment, the refresh frame image data is black frame image data corresponding to a black frame image.

In an exemplary embodiment, the black frame image data is provided to a plurality of horizontal lines of the display panel at the same time.

In an exemplary embodiment, the refresh frame image data is substantially the same as the left-eye frame image data provided to the display panel just before which the refresh frame image data is provided to the display panel, or a second left-eye frame image data which is generated using the left-eye frame image data provided to the display panel just before which the refresh frame image data is provided to the display panel.

In an exemplary embodiment, the refresh frame image data is substantially the same as the right-eye frame image data provided to the display panel just before which the refresh frame image data is provided to the display panel, or a second right-eye frame image data which is generated using the right-eye frame image data provided to the display panel just before which the refresh frame image data is provided to the display panel.

In an exemplary embodiment, first 3D image data including the left-eye frame image data and the right-eye frame image data is provided to the display panel in a first scanning direction and second 3D image data including the left-eye frame image data and the right-eye frame image data is provided to the display panel in a second other scanning direction.

In an exemplary embodiment, the display apparatus furthers include a polarization panel that is configured to change the left-eye frame image and the right-eye frame image displayed on the display panel into polarization lights different from each other.

In an exemplary embodiment, the display apparatus further includes a data correcting part configured to correct the 3D image data using a plurality of look-up tables ("LUTs") preset corresponding to one of a plurality of distinct regions of the display panel arranged along the scanning direction.

In an exemplary embodiment, each of the LUTs generates correction data using image data of frames adjacent each other.

According to at least one embodiment of the present invention, a data voltage is not provided to a display panel during a predetermined period and the data voltage provided previously is maintained, so that the luminance of the 3D image may be increased. In addition, the black frame image is inserted between the left-eye frame image and the right-eye frame image, so that the crosstalk of the 3D image may be reduced or prevented.

According to an exemplary embodiment of the invention, a display apparatus for displaying three-dimensional images includes a display panel and a timing control part. The display panel includes a plurality of pixels, gates lines, and data lines. The timing control part is configured to sequentially apply a data voltage of a left-eye image to the data lines during a first period, block application of a data voltage to the data lines during a second period, apply a black voltage of a black image to the data lines during a third period, and apply a data voltage of a right-eye image to the data lines. The timing control part adjusts a width of the third period in which the black voltage is applied to each subsequent row of the pixels to be larger than or smaller than a width of the third period in which the black voltage is applied to a prior one of the rows.

BRIEF DESCRIPTION OF THE DRAWINGS

The present invention will become more apparent by describing exemplary embodiments thereof with reference to the accompanying drawings, in which.

DETAILED DESCRIPTION

Hereinafter, exemplary embodiments of the present invention will be explained in detail with reference to the accompanying drawings. However, the present invention may be embodied in various different ways and should not be construed as limited to the exemplary embodiments described herein.

As used herein, the singular forms, "a," "an" and "the" are intended to include the plural forms as well, unless the context clearly indicates otherwise.

Figure 1:
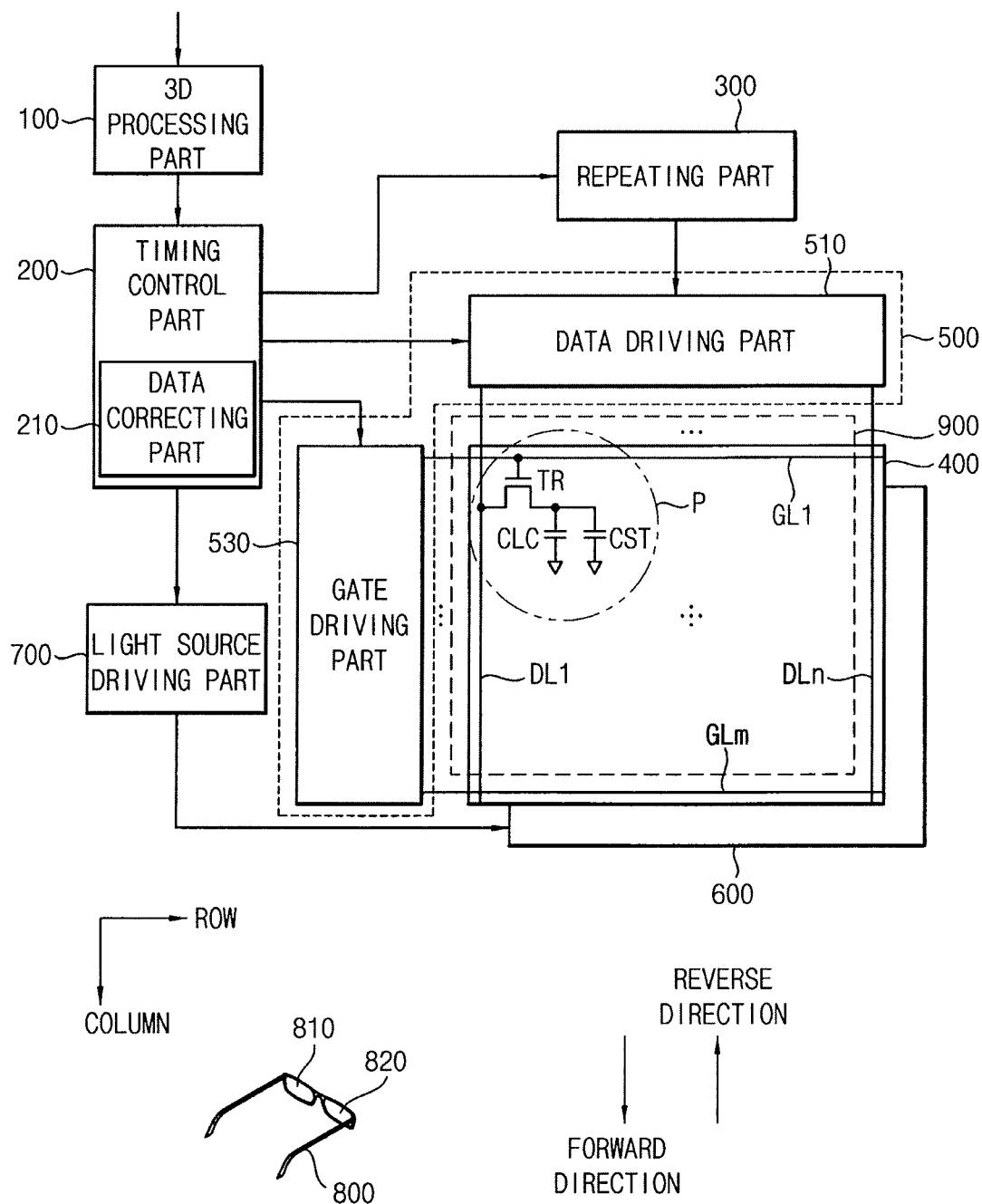
FIG. 1 is a block diagram illustrating a display apparatus according to an exemplary embodiment of the present invention.

FIG. 1 is a block diagram illustrating a display apparatus according to an exemplary embodiment of the present invention.

Referring to FIG. 1, the display apparatus includes a three-dimensional ("3D") processing part 100, a timing control part 200, a repeating part 300, a display panel 400, a panel driving part 500, a light source part 600, a light source driving part 700 and a glasses part 800.

In an embodiment, the 3D processing part 100 processes received source data by a frame unit into 3D image data in a 3D image mode. For example, 3D image data in a frame unit could correspond to the data required to display an image using all pixels of the display panel 400 during a given period. In an embodiment, the 3D processing part 100 divides the source data frame into a left-eye data and a right-eye data. In an embodiment, the 3D processing part 100 respectively scales the left-eye and right-eye data into left-eye and right-eye data frames corresponding to a resolution of the display panel 400. For example, if the 3D processing part receives the left-eye and right-eye frames in a resolution that is incompatible with the resolution of the display panel 400, it can convert the left-eye and right-eye frames into converted left-eye and right-eye frames that are compatible with the current resolution of the display panel 400. The 3D processing part 100 sequentially outputs the left-eye data frame and the right-eye data frame.

The timing control part 200 generates a timing control signal to drive the display apparatus, and controls the repeating part 300, the panel driving part 500 and the light source driving part 700. In an embodiment, the timing control part 200 also controls the 3D processing part 100. For example, in an embodiment, the 3D processing part 100 receives the resolution from the timing control part 200. The 3D processing part 100 may include a comparator for comparing the resolution of the display panel 400 with the resolution of the received image data to determine whether conversion of the image data is needed.

The timing control part 200 includes a data correcting part 210. In an embodiment, the data correcting part 210 corrects the 3D image data using a plurality of look-up tables ("LUTs") preset corresponding to a plurality of space areas which is included in the display panel 400 and arranged along a scanning direction. For example, distinct consecutive sets of rows of pixels of the display panel 400 (e.g., space areas) may correspond to distinct regions, which can be driven according to a chosen scanning direction. For example, if three regions are present, a scan in a forward scanning direction could correspond to sequential activation of the gate lines for the first, second, and third regions, while a scan in the reverse scanning direction could correspond to sequential activation of the gate lines of the third, second, and first regions.

For example, the data correcting part 210 corrects the left-eye data frame or the right-eye data frame presently received, based on the right-eye data frame or the left-eye data frame previously received. According to an exemplary embodiment, the data correcting part 210 includes the LUTs storing correction data respectively corresponding to the space areas (e.g., the distinct regions). A method of correcting the data using the data correcting part 210 according to an exemplary embodiment of the invention will be explained referring to FIG. 4.

The repeating part 300 repeats (e.g., duplicates) the 3D image data received by the frame unit from the timing control part 200 at least one time, based on a driving frequency of the display panel 500. For example, when the driving frequency of the display panel 500 is about 240 Hz, the repeating part 200 repeats the left-eye data frame or the right-eye data frame one time. For example, when the driving frequency of the display panel 500 is about 360 Hz, the repeating part 200 repeats the left-eye data frame or the right-eye data frame twice. However, the above-provided driving frequencies are merely examples, as the driving frequencies used to repeat a certain number of left-eye or right data frames may vary in alternate embodiments. In an embodiment, the repeating part 300 sequentially outputs at least two left-eye data frames and at least two right-eye data frames. In an exemplary embodiment, the repeating part 300 is omitted and no repetition of the left-eye and right-eye data frames occurs.

The display panel 400 includes first to n-th data lines DL1, ..., DLn, first to m-th gate lines GL1, ..., GLm, and a plurality of pixels P. The first to n-th data lines DL1, ..., DLn are extended along a column direction and arranged along a row direction. The first to m-th gate lines GL1, ..., GLm are extended along the row direction and arranged along the column direction. In an embodiment, each pixel P includes a switching element TR connected to a gate line GL1 and a data line DL1, a liquid crystal capacitor CLC connected to the switching element TR and a storage capacitor CST.

In an embodiment, the panel driving part 500 sequentially displays at least one left-eye frame image, at least one refresh frame image, at least one right-eye frame image and at least one refresh frame image on the display panel 400, using the data frames received from the repeating part 300. When the repeating part 300 is omitted, the data driving part 510 receives the left-eye and right-eye data frames directly from the timing control part 200. The panel driving part 500 includes a data driving part 510 and a gate driving part 530. Hereinafter, the refresh frame image may be referred to as a black frame image.

The data driving part 510 outputs a data voltage of the left-eye data frame to the display panel 400 during a first period, blocks the data voltage from being provided to the display panel 400 during a second period, and outputs a black data voltage to the display panel 400 during a third period under a control of the timing control part 200. In an embodiment, the first period is substantially the same as a sum of the second period and the third period. The data driving part 510 outputs a data voltage of the right-eye data frame to the display panel 400 during a fourth period, blocks the data voltage from being provided to the display panel 400 during a fifth period, and outputs the black data voltage to the display panel 400 during a sixth period under the control of the timing control part 200. In an embodiment, the fourth period is substantially the same as a sum of the fifth period and the sixth period.

In an embodiment, the gate driving part 530 sequentially outputs first to m-th gate signals to first to m-th gate lines of the display panel 400 at a first frequency during the first period, blocks the gate signals from being output to the gate lines during the second period, and sequentially outputs first to m-th gate signals to first to m-th gate lines of the display panel 400 at a second frequency higher than the first frequency during the third period under the control of the timing control part 200.

For example, the gate driving part 530 sequentially outputs first to m-th gate signals having a first pulse of a first horizontal period H1 during the first period, outputs the gate signals having a deactivated level (e.g., a low level) during the second period, and sequentially outputs first to m-th gate signals having a second pulse of a second horizontal period H2 that is less than the first horizontal period H1 during the third period. In addition, the gate driving part 510 sequentially outputs first to m-th gate signals having the first pulse of the first horizontal period H1 during the fourth period, outputs the gate signals having the deactivated level (e.g., a low level) during the fifth period, and sequentially outputs first to m-th gate signals having the second pulse of the second horizontal period H2 that is less than the first horizontal period H1 during the sixth period.

The light source part 600 provides a light to the display panel 400. The light source part 600 may be configured as a direct-illumination type or an edge-illumination type. The light source part 600 of the edge-illumination type includes a light guide plate (LGP) disposed under the display panel 400 and at least one light source disposed at an edge portion of the LOP. The light source part 600 of the direct-illumination type includes at least one light source directly disposed under the display panel 400, and omits the LGP. Examples of the light source include a light emitting diode.

The light source driving part 700 drives the light source part 600 according to the control of the timing control part 200. In an embodiment, the light source driving part 700 drives the light source part 600 using a global blinking method. For example, the light source part 600 provides light to the display panel 400 during a period in which the left-eye frame image or the right-eye frame image corresponding to the left-eye data frame or the right-eye data frame is displayed on the display panel 400, and blocks the light from the display panel 400 during a period in which the black frame image corresponding to the black data voltage is displayed on the display panel 400.

The glasses part 800 includes a left-eye part 810 and a right-eye part 820. The glasses part 800 may use an active shutter glasses mode or a passive polarization glasses mode. The left-eye part 810 transmits the left-eye frame image and blocks the right-eye frame image. The right-eye part 820 transmits the right-eye frame image and blocks the left-eye frame image.

When the glasses part 800 uses the passive polarization glasses mode, the display apparatus may further include a polarization panel 900 disposed on the display panel 400. The polarization panel 900 changes the left-eye frame image and the right-eye frame image displayed on the display panel 400 into polarized lights different from each other. Thus, the left-eye part 810 and the right-eye part 820 of the glasses part 800 may selectively transmit the polarized left-eye frame image and the right-eye frame image.

Figure 2:
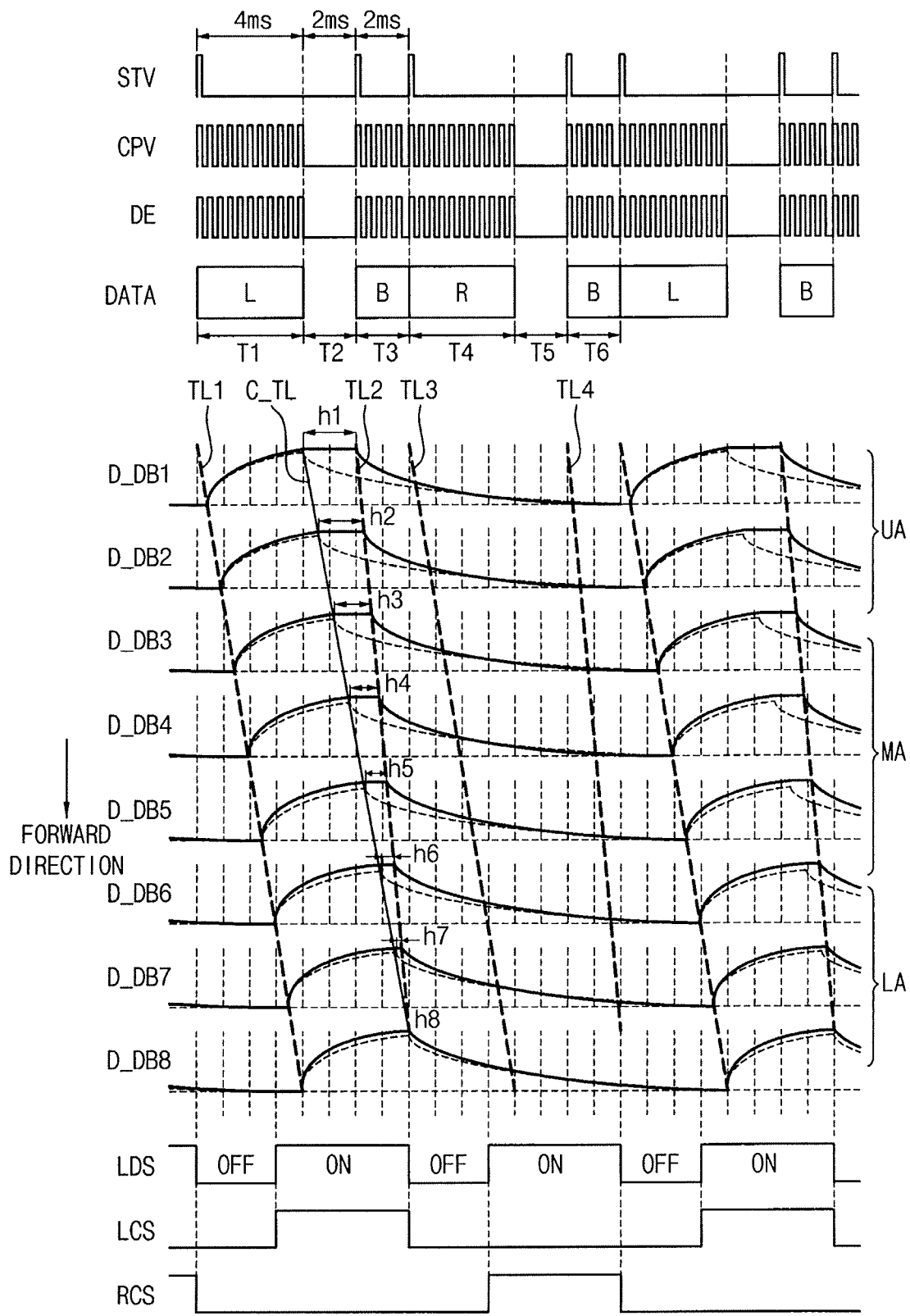
FIG. 2 is a waveform diagram illustrating a method of driving a display panel of FIG. 1 according to an exemplary embodiment of the present invention.

FIG. 2 is a waveform diagram illustrating a method of driving a display panel of FIG. 1 according to an exemplary embodiment of the invention.

Referring to FIGS. 1 and 2, the panel driving part 500 drives the display panel 400 based on the timing control signal of a vertical starting signal STV, a gate clock signal CPV and a data enable signal DE, etc, generated from the timing part 200. Hereinafter, the driving frequency of the display panel 400 may be assumed to be about 240 Hz, the left-eye data frame may be assumed to be white grayscale data and the right-eye data frame may be assumed to be black grayscale data. However, embodiments of the invention are not limited to any particular driving frequency.

The data driving part 510 outputs the data voltage to the display panel 400 based on the data enable signal DE. The data enable signal DE is activated during the first period T1, is inactivated during the second period T2, and is activated during the third period T3. The data enable signal DE is activated during the fourth period T4, is inactivated during the fifth period T5, and is activated during the sixth period T6.

Based on the data enable signal DE, the data driving part 510 outputs the data voltage of the left-eye data frame L to the display panel 400 during the first period T1, blocks the data voltage from being output to the display panel 400 during the second period T2, and outputs the black data voltage B to the display panel 400 during the third period T3. The data driving part 510 outputs the data voltage of the right-eye data frame R to the display panel 400 during the fourth period T4, blocks the data voltage from being output to the display panel 400 during the fifth period T5, and outputs the black data voltage B to the display panel 400 during the sixth period T6.

In an embodiment, the gate driving part 530 generates gate signals for output to the display panel 400 based on the vertical starting signal STV and the gate clock signal CPV. The vertical starting signal STV controls the start of driving the gate driving part 530. Thus, the vertical starting signal STV has a pulse at a beginning of each of the first period T1, the third period T3, the fourth period T4, the sixth period T6, etc., during which the data enable signal DE is activated. In an embodiment, the gate clock signal CPV controls a pulse width of each of the first to m-th gate signals. Thus, the gate clock signal CPV has a first horizontal period during the first and fourth periods T1 and T4 during which the data voltage of the left-eye data frame L or the right-eye data frame R is output to the display panel 400. The gate clock signal CPV has a second horizontal period different from the first horizontal period during the third and sixth periods T3 and T6 during which the black data voltage B is output to the display panel 400.

Based on the vertical starting signal STV and the gate clock signal CPV, the gate driving part 530 sequentially outputs the first to m-th gate signals having a first pulse corresponding to the first horizontal period to display panel 400 during the first period T1. During the second period T2, the gate driving part 530 blocks the first to m-th gate signals from being output to the display panel 400, or outputs the first to m-th gate signals having a low level. During the third period T3, the gate driving part 530 sequentially outputs the first to m-th gate signals having a second pulse corresponding to the second horizontal period that is less than the first horizontal period.

During the fourth period T4, the gate driving part 530 sequentially outputs the first to m-th gate signals having the first pulse corresponding to the first horizontal period to display panel 400. During the fifth period T5, the gate driving part 530 blocks the first to m-th gate signals from being output to the display panel 400, or outputs the first to m-th gate signals having the low level. During the sixth period T6, the gate driving part 530 sequentially outputs the first to m-th gate signals having the second pulse corresponding to the second horizontal period that is less than the first horizontal period.

In an embodiment, the first period T1 is greater than the third period T3 and is equal to a sum of the second period T2 and the third period T3, and the second period T2 is equal to the third period T3. In an embodiment, the fourth period T4 is greater than the sixth period T6 and is a sum of the fifth period T5 and the sixth period T6, and the fifth period T5 is equal to the sixth period T6.

According to the control of the timing control part 200, the light source driving part 700 generates a light source driving signal LDS. In an embodiment, the light source driving signal LDS has a high level during an image period ON during which the light is generated and a low level during a black period OFF during which the light is blocked. In addition, the timing part 200 may generate a left-eye control signal LCS and a right-eye control signal RCS. In an embodiment, the left-eye control signal LCS has a high level during a period in which the display panel 400 displays the left-eye frame image and the light source part 600 emits the light. In the embodiment, the right-eye control signal RCS has a high level during a period in which the display panel 400 displays the right-eye frame image and the light source part 600 emits the light.

When the glasses part 800 uses the active shutter glasses mode, the left-eye control signal LCS controls a shutter of the left-eye part 810 and the right-eye control signal RCS controls a shutter of the right-eye part 820. Thus, the left-eye part 810 transmits the left-eye frame image and blocks the right-eye frame image, and the right-eye part 820 transmits the right-eye frame image and blocks the left-eye frame image.

Alternatively, when the glasses part 800 uses the passive polarization glasses mode, the left-eye control signal LCS and the right-eye control signal RCS control the polarization panel 900. The polarization panel 900 is disposed on the display panel 400. The polarization panel 900 changes the left-eye frame image displayed on the display panel 400 into a first polarized light and changes the right-eye frame image displayed on the display panel 400 into a second polarized light. The left-eye control signal LCS controls the polarization panel 900 to change the left-eye frame image into the first polarized light, and the right-eye control signal RCS controls the polarization panel 900 to change the right-eye frame image into the second polarized light. Thus, the left-eye part 810 of the glasses part 800 transmits the first polarized left-eye frame image and blocks the second polarized right-eye frame image. The right-eye part 820 of the glasses part 800 transmits the second polarized right-eye frame image and blocks the first polarized left-eye frame image. The display panel 400 may be divided into first, second, third, fourth, fifth, sixth, seventh and eighth display blocks, and the first, second, third, fourth, fifth, sixth, seventh and eighth display blocks may have first, second, third, fourth, fifth, sixth, seventh and eighth driving waveforms D_DB1, D_DB2, D_DB3, D_DB4, D_DB5, D_DB6, D_DB7 and D_DB8 based on a liquid crystal response time of the display panel 400. In an embodiment, the display blocks correspond to consecutive horizontal rows of the display panel 400.

According to the first to eighth driving waveforms D_DB1 to D_DB8, the image period ON of the light source driving signal LDS is a period during which the display panel 400 displays the left-eye frame image or the right-eye frame image, and the black period OFF of the light source driving signal LDS is a period during which the display panel 400 displays the black frame image.

Referring to the first to eighth driving waveforms D_DB1, D_DB2, D_DB3, D_DB4, D_DB5, D_DB6, D_DB7 and D_DB8, the data voltage of the left-eye data frame is sequentially provided to the first to eighth display blocks. Timings at which the data voltage of the left-eye data frame is provided to the first to eighth display blocks, may be arranged along a first slope line TL1 having a first slope angle.

During the second period T2, the data driving part 510 does not provide the data voltage to the first to eighth display blocks of the display panel 400. For example, gate signals applied to gate lines of the display panel 400 may be deactivated during the second period T2 to prevent application of the data voltage to the data lines. Thus, the first to eighth display blocks maintain the data voltage of the left-eye data frame L provided during the first period T1. As shown in FIG. 2, the first to eighth display blocks have first to eighth holding periods h1, h2, . . . , h8 which are gradually decreased along the scanning direction of the forward direction.

During the third period T3, the black data voltage is sequentially provided to the first to eighth display blocks. Timings at which the black data voltage B is provided to the first to eighth display blocks, may be arranged along a second slope line TL2 having a second slope angle different from the first slope angle.

For example, the first holding period h1 may be substantially the same as the second period T2, the second holding period h2 may be less than the first holding period h1, the third holding period h3 may be less than the second holding period h2, the fourth holding period h4 may be less than the third holding period h3, the fifth holding period h5 may be less than the fourth holding period h4, the sixth holding period h6 may be less than the fifth holding period h5, the seventh holding period h7 may be the sixth holding period h6, and the eighth holding period h8 may be less than the seventh holding period h7.

The first to eighth holding periods h1, h2, . . . , h8 may be included within the image period ON of the light source driving signal LDS.

According to a driving method C_TL in which the black data voltage is provided to the display panel 400 during the second period T2, the upper area UA of the display panel receives the black data voltage by the LC response time while the lower area LA of the display panel 400 receives the data voltage of the left-eye data frame. During the image period ON of the light source driving signal LDS, the lower area LA receives the data voltage of the left-eye data frame and the upper area UA receives the black data voltage. Thus, a luminance of the upper area UA may be less than that of the lower area LA.

However, according to the an exemplary embodiment, the holding periods h1, h2, . . . , h8 during which the data voltage of the left-eye data frame L is maintained, are included in the image period ON. The holding periods h1, h2, . . . , h8 are gradually decreased from the upper area UA toward the lower area LA. Thus, the luminance of the upper area UA may be increased. Therefore, the luminance of the left-eye frame image corresponding to the left-eye data frame L may be increased.

In addition, during the fourth period T4, the data voltage of the right-eye data frame is sequentially provided to the first to eighth display blocks. Timings at which the data voltage of the right-eye data frame R is provided to the first to eighth display blocks, may be arranged along a third slope line TL3 having the first slope angle.

During the fifth period T5, the data driving part 510 does not provide the data voltage to the first to eighth display blocks. Thus, the first to eighth display blocks maintain the data voltage of the right-eye data frame provided during the fourth period T4. As shown in FIG. 2, the first to eighth display blocks have first to eighth holding periods h1, h2, . . . , h8 which are gradually decreased along the scanning direction of the forward direction.

During the sixth period T6, the black data voltage is sequentially provided to the first to eighth display blocks. Timings at which the black data voltage B is provided to the first to eighth display blocks, may be arranged along a fourth slope line TL4 having the second slope angle.

The first to eighth holding periods h1, h2, . . . , h8 may be included within the image period ON of the light source driving signal LDS.

The holding periods h1, h2, . . . , h8 during which the data voltage of the right-eye data frame R is maintained may be included within the image period ON. Therefore, the luminance of the right-eye frame image corresponding to the right-eye data frame R may be increased.

According to an exemplary embodiment of the invention, the data voltage is not provided to the display panel during a predetermined period and the data voltage provided previously is maintained, so that the luminance of the 3D image may be increased. In addition, the black frame image is inserted between the left-eye frame image and the right-eye frame image, so that the crosstalk of the 3D image may be reduced or prevented.

However, according to the second slope line TL2 corresponding to the timings at which the black data voltage is provided to the display panel 400 and the third slope line TL3 corresponding to the timings at which the data voltage of the right-eye data frame is provided to the display panel 400, a period during which the black data voltage is provided to the display panel 400 is gradually increased from the first display block to the eighth display block along the forward direction. Therefore, the display panel 400 displays a black image which gradually becomes darker along the scanning direction of the forward direction.

The gradually changing black image has black-grayscale differences between the upper area UA, middle area MA and the lower area LA of the display panel 400. Thus, the gradually changing black image is inserted between the left-eye frame image and the right-eye frame image, so that the left-eye frame image and the right-eye frame image may have grayscale differences between the upper area UA, middle area MA and the lower area LA.

According to an exemplary embodiment, the timing control part 200 includes the data correcting part 210 correcting grayscale differences between the upper area UA, middle area MA and the lower area LA included in the left-eye and right-eye frame images.

Figure 3:
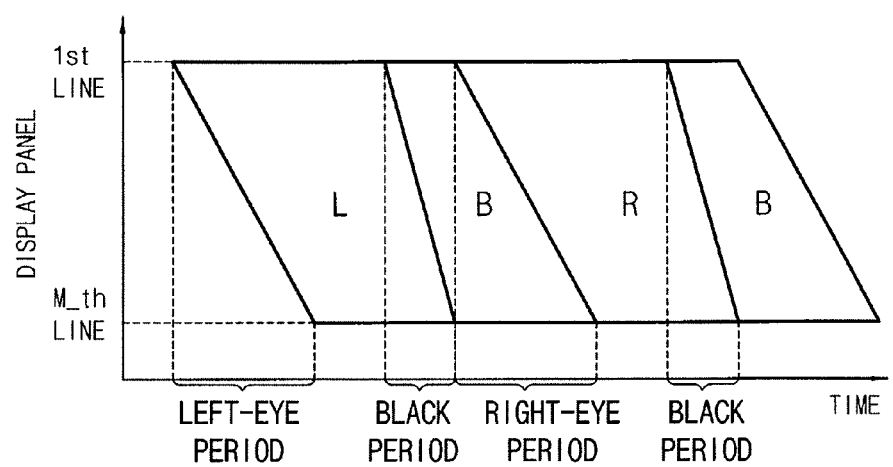
FIG. 3 is a conceptual diagram illustrating a method of driving a display panel of FIG. 1 according to an exemplary embodiment of the present invention.

FIG. 3 is a conceptual diagram illustrating a method of driving a display panel of FIG. 1 according to an exemplary embodiment of the invention.

Referring to FIG. 3, a left-eye period or a right-eye period during which the data voltage of the left-eye data frame L or the right-eye data frame R is provided to the display panel 400 may be different from a black period during which the black data voltage B is provided to the display panel 400. The left-eye period or the right-eye period may be longer than the black period. In addition, the data voltage of the left-eye data frame L, the black data voltage B, the data voltage of the right-eye data frame R and the black data voltage B are sequentially provided to the display panel 400, so that shapes of holding periods during which the data voltages L, B, R and B are maintained in the display panel 400 may be the same as shown in FIG. 3.

Referring to FIG. 3, each of holding periods corresponding to the data voltages of the left-eye and right-eye data frames L and R may be gradually decreased from the upper area of the display panel 400 toward the lower area of the display panel 400. Referring to the holding periods corresponding to the data voltages of the left-eye and right-eye data frames L and R of FIG. 3, a holding period corresponding to a first horizontal line 1st LINE of the display panel 400 may be longest and a holding period corresponding to a last horizontal line M-th LINE of the display panel 400 may be shortest.

A holding period corresponding to the black data voltage B may be gradually increased from the upper area of the display panel 400 toward the lower area of the display panel 400. Referring to the holding period corresponding to the black data voltage B of FIG. 3, a holding period corresponding to a first horizontal line 1st LINE of the display panel 400 may be the shortest and a holding period corresponding to a last horizontal line M-th LINE of the display panel 400 may be the longest.

Figure 4:
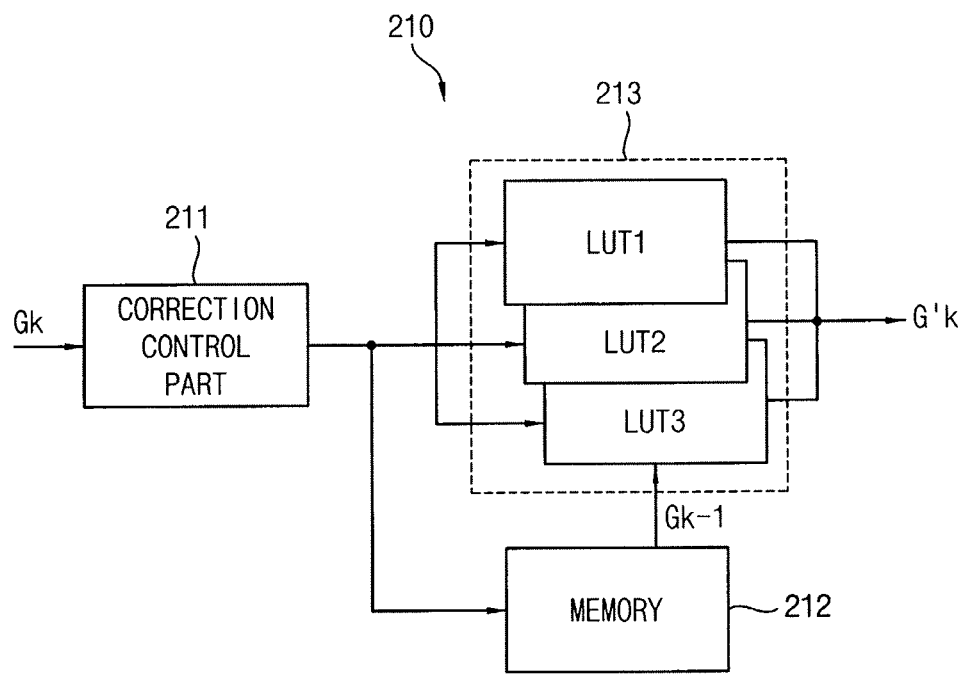
FIG. 4 is a block diagram illustrating a data correcting part of FIG. 1 according to an exemplary embodiment of the present invention.

FIG. 4 is a block diagram illustrating a data correcting part of FIG. 1 according to an exemplary embodiment of the invention.

Referring to FIGS. 2 and 4, the timing control part 200 includes a data correcting part 210. The data correcting part 210 includes a correction control part 211, a memory 212 and a correcting part 213.

The correction control part 211 determines the space area (e.g., region) of the display panel 400 included in the pixel corresponding to the image data GK received presently. The correction control part 211 controls the correcting part 213 based on the determined space area of the image data GK.

The memory 212 stores the present image data GK received presently under a control of the correction control part 211. The previous image data GK−1 received previously corresponding to the present image data GK is readout from the memory 212 and provided to the correcting part 213 under a control of the correction control part 211.

The correcting part 213 stores correction data for correcting black-grayscale differences of the image data respectively corresponding to the space areas. The space areas may be divided along the scanning direction of the display panel 400. For example, a space area may correspond to a certain consecutive set of pixel rows of the display panel 400.

For example, the correcting part 213 includes a first LUT LUT1 storing first correction data corresponding to the upper area UA, a second LUT LUT2 storing second correction data corresponding to the middle area MA, and a third LUT LUT3 storing third correction data corresponding to the lower area LA. The divided space areas are not limited into the upper, middle and lower areas, and may be variously preset.

The black frame image inserted between the left-eye frame image and the right-eye frame image is the gradually changing black frame image including black grayscales which are gradually increased from the upper area UA toward the lower area LA.

For example, a black image displayed on the upper area UA may be assumed to be a 30-grayscale, a black image displayed on the middle area MA may be assumed to be a 20-grayscale and a black image displayed on the lower area LA may be assumed to be a 10-grayscale. The first LUT LUT1 stores the correction data corresponding to the present image data based on the black image data of the 30-grayscale inserted between the previous image data received previously and the present image data received presently. The second LUT LUT2 stores the correction data corresponding to the present image data based on the black image data of the 20-grayscale inserted between the previous image data received previously and the present image data received presently. The third LUT LUT3 stores the correction data corresponding to the present image data based on the black image data of the 10-grayscale inserted between the previous image data received previously and the present image data received presently.

For example, when the present image data Gk is image data of a 200-grayscale and the previous image data Gk−1 is image data of the 200-grayscale, the present image data may be corrected into the correction data G'k of a 210-grayscale based on the inserted black image data of the 30-grayscale in the upper area UA, the present image data may be corrected into the correction data G'k of a 220-grayscale based on the inserted black image data of the 20-grayscale less than the 30-grayscale in the middle area MA and the present image data may be corrected into the correction data G'k of a 230-grayscale based on the inserted black image data of the 10-grayscale less than the 20-grayscale in the lower area LA. The image data of the lower area LA displaying the black image of a lower grayscale may be overdriven with respect to the image data of the upper area UA displaying the black image of a higher grayscale.

As described above, the data correcting part 210 may correct the grayscale difference between the left-eye frame image and right-eye frame image due to the inserted gradually changing black image.

Figure 5A:
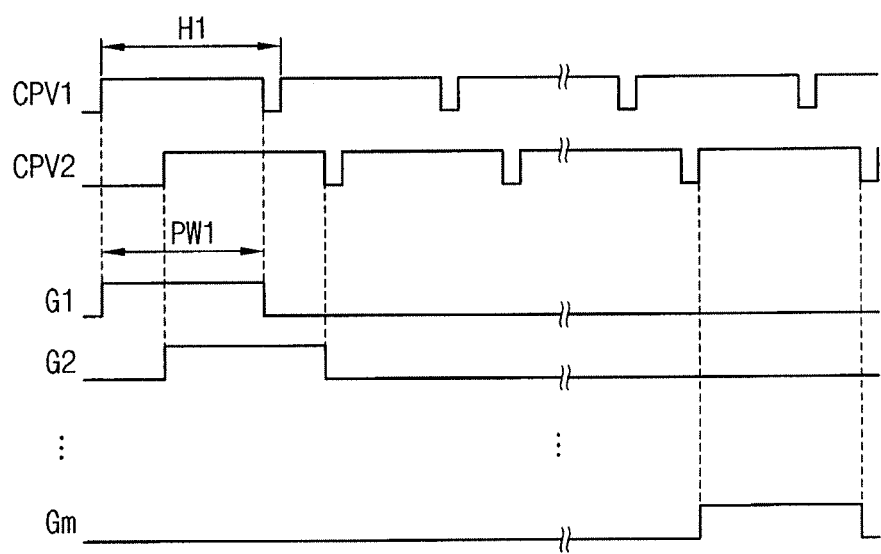
FIGS. 5A and 5B are timing diagrams illustrating a method of driving a gate driving part of FIG. 1 according to an exemplary embodiment of the present invention.
Figure 5B:
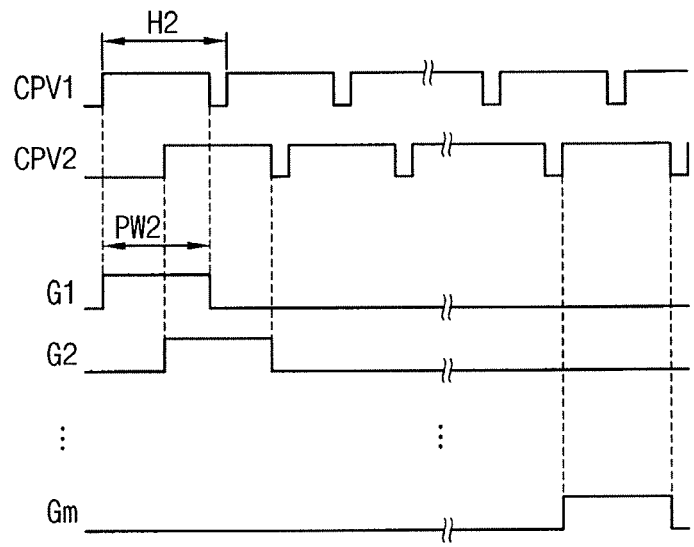

FIGS. 5A and 5B are timing diagrams illustrating a method of driving a gate driving part of FIG. 1 according to an exemplary embodiment of the invention.

FIG. 5A is a waveform diagram illustrating input and output signals of the gate driving part 530 shown in FIG. 1 during the first period T1 or the fourth period T4.

Referring to FIGS. 2 and 5A, the timing control part 200 generates a first gate clock signal CPV1 and a second gate signal CPV2 having the first horizontal period H1 during the first period T1 or the fourth period T4. The first gate clock signal CPV1 may be different from the second gate clock signal CPV2 and may have a delay difference with respect to the second gate clock signal CPV2.

In an embodiment, the gate driving part 530 outputs the odd-numbered gate signals G1, G3, . . . based on the first gate clock signal CPV1, and outputs the even-numbered gate signals G2, G4 . . . , Gm based on the second gate clock signal CPV2.

Each of the first to m-th gate signals G1, G2, . . . , Gm has a first pulse PW1 corresponding to the first horizontal period H1.

FIG. 5B is a waveform diagram illustrating input and output signals of the gate driving part 530 shown in FIG. 1 during the third period T3 or the sixth period T6.

Referring to FIGS. 2 and 5B, the timing control part 200 generates a first gate clock signal CPV1 and a second gate signal CPV2 having a second horizontal period H2 that is less than the first horizontal period H1 during the third period T3 or the sixth period T6. The first gate clock signal CPV1 may be different from the second gate clock signal CPV2 and may have a delay difference with respect to the second gate clock signal CPV2.

In an embodiment, the gate driving part 530 outputs the odd-numbered gate signals G1, G3, . . . , based on the first gate clock signal CPV1, and outputs the even-numbered gate signals G2, G4, . . . , based on the second gate clock signal CPV2.

Each of the first to m-th gate signals G1, G2, . . . , Gm has a second pulse PW2 corresponding to the second horizontal period H2 and is less than the first pulse PW1.

Referring to FIGS. 5A and 5B, the gate driving part 530 outputs the first to m-th gate signals G1, G2, . . . , Gm having the first pulse PW1 and corresponding to the first horizontal period H1 during the first or fourth period T1 or T4 during which the data voltage of the left-eye data frame or the right-eye data frame is provided to the display panel 400.

The gate driving part 530 outputs the first to m-th gate signals G1, G2, . . . , Gm having the second pulse PW2 less than the first pulse PW1 and corresponding to the second horizontal period H2 less than the first horizontal period H1 during the third period or the sixth period T3 or T6 during which the black data voltage of the black data frame is provided to the display panel 400.

Therefore, during the third or sixth period T3 or T6 less than the first period or the fourth period T1 or T4, the black data voltage may be provided to the display panel 400.

According to an exemplary embodiment of the invention, a period during which the black data voltage is provided to the display panel may be decreased by about ½, ⅓, ¼, etc. with respect to a period during which the data voltage of the left-eye data frame or the right-eye data frame is provided to the display panel.

Figure 6:
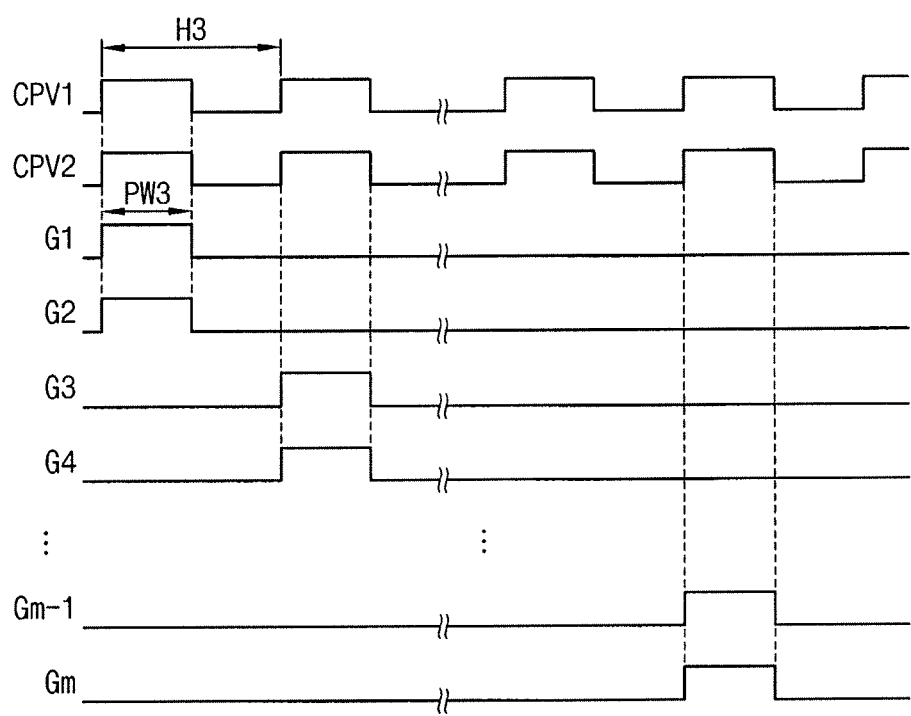
FIG. 6 is a timing diagram illustrating a method of driving a gate driving part according to an exemplary embodiment of the present invention.

FIG. 6 is a timing diagram illustrating a method of driving a gate driving part according to an exemplary embodiment of the present invention.

FIG. 6 is a timing diagram illustrating input and output of the gate driving part 530 during the third period or the sixth period T3 or T6 during which the black data voltage is provided to the display panel 400.

According to an exemplary embodiment of the invention, the gate driving part 530 sequentially outputs first to m-th gate signals G1, G2, . . . , Gm corresponding to the third horizontal period H3 and having the third pulse PW3 using the first gate clock signal CPV1 and the second gate signal CPV2 having the third horizontal period H3 during the first period or the fourth period T1 or T4 during which the data voltage of the left-eye data frame or the right-eye data frame is provided to the display panel 400. The first gate clock signal CPV1 may be different from the second gate clock signal CPV2 and may have a delay difference with respect to the second gate clock signal CPV2. The third pulse PW3 may be equal to or less than the first pulse PW1.

The timing control part 201 generates the first gate clock signal CPV1 and the second gate signal CPV2 having a third horizontal period H3 being equal to or less than the first horizontal period H1 during the third period or the sixth period T3 or T6. The first and second gate clock signals CPV1 and CPV2 are substantially the same signal. Each of the first and second gate clock signals CPV1 and CPV2 includes a high period having a high level and a low period having a low level. The high period and the low period may be substantially the same as each other.

In an embodiment, the gate driving part 530 outputs the odd-numbered gate signals G1, G3, . . . , based on the first gate clock signal CPV1 and outputs the even-numbered gate signals G2, G4 . . . , based on the second gate clock signal CPV2.

The first and second gate clock signals CPV1 and CPV2 are substantially the same as each other, so that the odd-numbered gate signal G1 and the even-numbered gate signal G2 adjacent the odd-numbered gate signal G1 are substantially the same as each other. Two gate lines receiving the same gate signals are activated at the same time.

A frame period activated during the first to m-th gate signals G1, G2, . . . , Gm of the display panel 400 may be decreased by about ½ as compared with a frame period shown in FIG. 5A.

Therefore, during the third or sixth period T3 or T6 less than the first or fourth period T1 or T4, the black data voltage may be provided to the display panel 400.

In an exemplary embodiment, the period during which the black data voltage is provided to the display panel 400 may be decreased by about ½ as compared with a period during which the data voltage of the left-eye data frame or the right-eye data frame is provided to the display panel 400, but is not limited thereto. For example, when the same gate signal is provided to three gate lines adjacent each other, in the period during which the black data voltage is provided to the display panel 400, the black data voltage may be decreased by about ⅓, and when the same gate signal is provided to four gate lines adjacent each other, in the period during which the black data voltage is provided to the display panel, the black data voltage may be decreased by about ¼.

Figure 7:
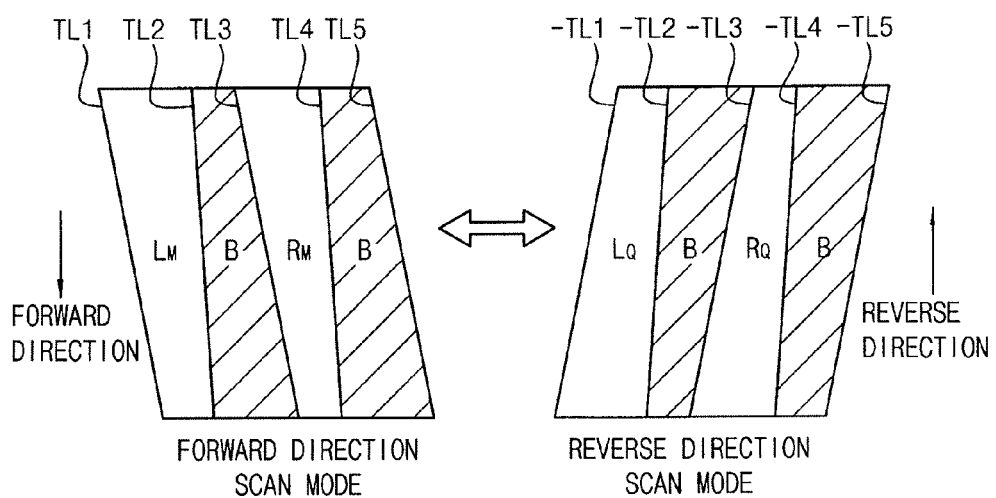
FIG. 7 is a conceptual diagram illustrating a method of driving a display panel according to an exemplary embodiment of the present invention.
Figure 8:
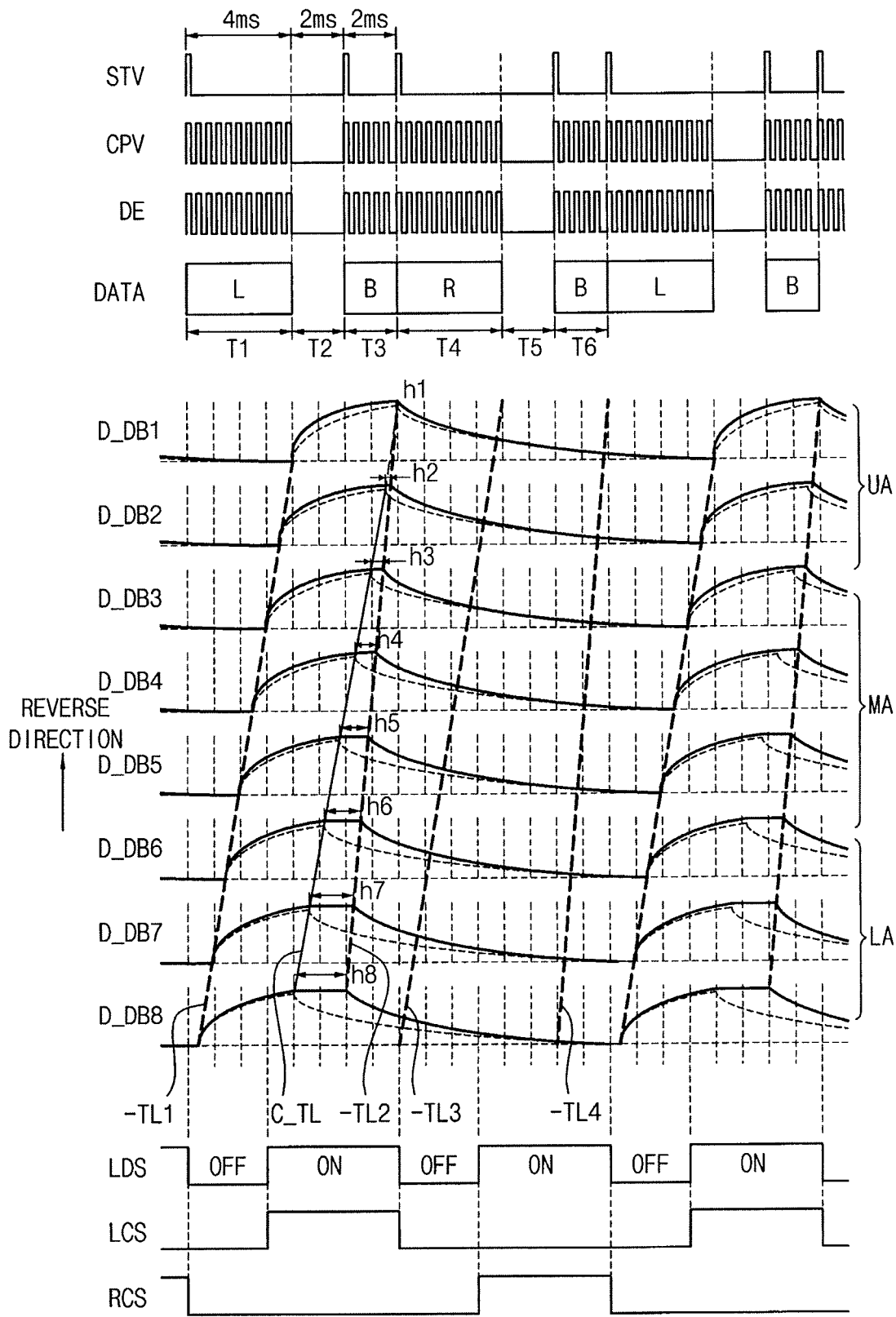
FIG. 8 is a waveform diagram illustrating a method of driving the display panel of FIG. 7 according to an exemplary embodiment of the present invention.

FIG. 7 is a conceptual diagram illustrating a method of driving a display panel according to an exemplary embodiment of the present invention. FIG. 8 is a waveform diagram illustrating a method of driving the display panel of FIG. 7 according to an exemplary embodiment of the present invention.

Referring to FIGS. 2 and 7, the method of driving the display panel according to an exemplary embodiment includes a method of driving with a forward direction scan mode and a reverse direction scan mode alternately.

The timing control part 200 controls the panel driving part 500 to drive the display panel 400 with the forward direction scan mode. The panel driving part 500 displays an M-th left-eye data frame LM and an M-th right-eye data frame RM corresponding to an M-th source image data (e.g., M is a natural number) on the display panel 400 according to the scanning direction of the forward direction.

The data driving part 510 sequentially outputs a data voltage of the M-th left-eye data frame LM and the M-th right-eye data frame RM from a first horizontal line to an m-th horizontal line according to the scanning direction of the forward direction. The gate driving part 530 sequentially outputs gate signals from the first gate signal G1 corresponding to a first gate line to the m-th gate line Gm as described in FIGS. 5A, 5B and 6.

Therefore, the M-th left-eye data frame LM is provided to the display panel 400 during a period defined by the first slope line TL1 and the second slope line TL2, and the black data voltage is provided to the display panel 400 during a period defined by the second slope line TL2 and the third slope line TL3. In addition, the M-th right-eye data frame RM is provided to the display panel 400 during a period defined by a third slope line TL3 substantially parallel to the first slope line TL1 and a fourth slope line TL4 substantially parallel to the second slope line TL2, and the black data voltage is provided to the display panel 400 during a period defined by the fourth slope line TL4 and a fifth slope line TL5 substantially parallel to the third slope line TL3.

As shown in FIG. 7, the period during which the black data voltage is provided to the display panel 400 may be increased from the upper area of the display panel 400 toward the lower area of the display panel 400 along the forward direction.

Then, the timing control part 200 controls the panel driving part 500 to drive the display panel 400 with the reverse direction scan mode. The panel driving part 500 displays a Q-th left-eye data frame LQ and a Q-th right-eye data frame RQ corresponding to a Q-th source image data (e.g., Q is a natural number) on the display panel 400 according to the scanning direction of the reverse direction.

The data driving part 510 sequentially outputs a data voltage of the Q-th left-eye data frame LQ and the Q-th right-eye data frame RQ from the first horizontal line to the m-th horizontal line according to the scanning direction of the reverse direction. The gate driving part 530 sequentially outputs gate signals from the first gate signal G1 corresponding to a first gate line to the m-th gate line Gm.

Referring to FIG. 5A, the gate driving part 530 sequentially outputs the gate signal having the first pulse PW1 corresponding to the first horizontal period H1 from the m-th gate signal Gm to the first gate signal G1 along the reverse direction during the period in which the data voltage of the left-eye and right-eye data frames is provided to the display panel 400.

Alternatively, referring to FIG. 5B, the gate driving part 530 sequentially outputs the gate signal having the second pulse PW2 corresponding to the second horizontal period H2 from the m-th gate signal Gm to the first gate signal G1 along the reverse direction during the period in which the black data voltage is provided to the display panel 400.

Alternatively, referring to FIG. 6, the gate driving part 530 sequentially outputs the gate signal having the third pulse PW3 corresponding to the third horizontal period H3 to at least two gate lines adjacent each other along the reverse direction during the period in which the black data voltage is provided to the display panel 400.

Referring to FIGS. 7 and 8, the first, second, third, fourth, fifth, sixth, seventh and eighth display blocks of the display panel 400 may have first, second, third, fourth, fifth, sixth, seventh and eighth driving waveforms D_DB1, D_DB2, D_DB3, D_DB4, D_DB5, D_DB6, D_DB7 and D_DB8 according to the reverse direction scan mode.

Referring to the first to eighth driving waveforms D_DB1, D_DB2, D_DB3, D_DB4, D_DB5, D_DB6, D_DB7 and D_DB8, the data voltage of the left-eye data frame L is sequentially provided to the eighth display block to the first display block during the first period T1. When a first positive slope line TL1 has a positive first slope angle, the data voltage of the left-eye data frame L may be provided to the display blocks of the display panel 400 at timings arranged along a first negative slope line −TL1 having a first negative slope angle.

During the second period T2, the data driving part 510 does not provide the data voltage to the display panel 400. For example, the data voltage may be blocked from application to data lines of the display panel 400 by deactivating the gate signals. Thus, the eighth to first display blocks maintain the data voltage of the left-eye data frame provided during the first period T1. As shown in FIG. 8, the eighth to first display blocks have eighth to first holding periods h8, h7, . . . , h1 which are gradually decreased along the scanning direction of the reverse direction.

During the third period T3, the black data voltage B is sequentially provided to the eighth to first display blocks. When a second positive slope line TL2 has a positive first slope angle, the black data voltage may be provided to the display blocks of the display panel 400 at timings arranged along a second negative slope line −TL2 having a second negative slope angle.

For example, the eighth holding period h8 is substantially the same as the second period T2, the seventh holding period h7 is less than the eighth holding period h8, the sixth holding period h6 is less than the seventh holding period h7, the fifth holding period h5 is less than the sixth holding period h6, the fourth holding period h4 is less than the fifth holding period h5, the third holding period h3 is less than the fourth holding period h4, the second holding period h2 is less than the third holding period h3, and the first holding period h1 is less than the second holding period h2.

The eighth to first holding periods h8, h7, . . . , h1 are included within the image period ON of the light source driving signal LDS. Thus, a luminance of the 3D image may be increased by the eighth to first holding periods h8, h7, . . . , h1 included within the image period ON.

Then, during the fourth period T4, the data voltage of the right-eye data frame R is sequentially provided to the eighth display block to the first display block. The data voltage of the right-eye data frame R may be provided to the display blocks of the display panel 400 at timings arranged along a third negative slope line −TL3 substantially parallel to the first negative slope line −TL1.

During the fifth period T5, the data driving part 510 does not provide the data voltage to the display panel 400. For example, the data voltage may be blocked from application to data lines of the display panel 400 by deactivating the gate signals. Thus, the eighth to first display blocks maintain the data voltage of the left-eye data frame provided during the fourth period T4.

During the sixth period T6, the black data voltage B is sequentially provided to the eighth to first display blocks. The black data voltage may be provided to the display blocks of the display panel 400 at timings arranged along a fourth negative slope line −TL4 substantially parallel to the second negative slope line −TL2.

Therefore, the Q-th left-eye data frame LQ is provided to the display panel 400 during a period defined by the first negative slope line −TL1 and the second negative slope line −TL2, and the black data voltage is provided to the display panel 400 during a period defined by the negative second slope line −TL2 and the third negative slope line −TL3. In addition, the Q-th right-eye data frame RQ is provided to the display panel 400 during a period defined by a third negative slope line −TL3 and a fourth negative slope line −TL4, and the black data voltage is provided to the display panel 400 during a period defined by the fourth negative slope line −TL4 and a fifth negative slope line −TL5.

The period B during which the black data voltage is provided to the display panel 400 in the forward direction scan mode and the period B during which the black data voltage is provided to the display panel 400 in the reverse direction scan mode, may each have a bottom-top symmetric structure. For example, the period B during which the black data voltage is provided to the display panel 400 in the forward direction scan mode may be gradually increased along the forward direction, and the period B during which the black data voltage is provided to the display panel 400 in the reverse direction scan mode may be gradually decreased along the reverse direction.

Therefore, the black grayscale difference between the upper, middle and lower areas of the frame image in the forward direction scan mode and the black grayscale difference between the upper, middle and lower areas of the frame image in the reverse direction scan mode, may be offset with each other, so that the black grayscale difference of the frame image may be removed.

According to an exemplary embodiment of the invention, the display panel 400 is alternately driven with the forward direction scan mode and the reverse direction scan mode, so that the data correcting part described previously may be omitted and the black grayscale difference of the frame image may be removed.

According to an exemplary embodiment of the invention, the data voltage is not provided to the display panel during a predetermined period and the data voltage provided previously is maintained, so that the luminance of the 3D image may be increased. In addition, the black frame image is inserted between the left-eye frame image and the right-eye frame image, so that the crosstalk of the 3D image may be reduced or prevented.

Figure 9:
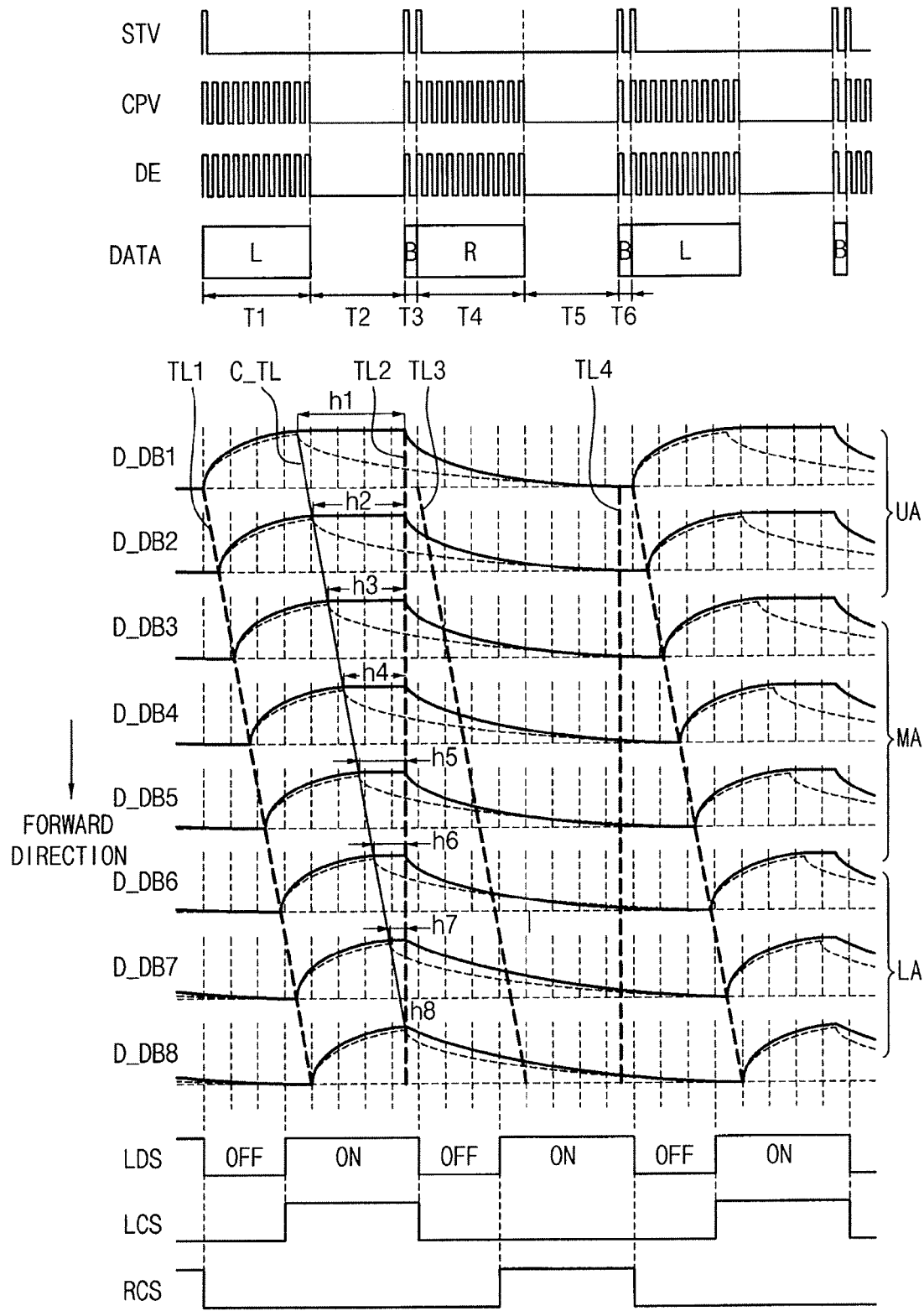
FIG. 9 is a conceptual diagram illustrating a method of driving a display panel according to an exemplary embodiment of the present invention.

FIG. 9 is a conceptual diagram illustrating a method of driving a display panel according to an exemplary embodiment of the present invention.

Referring to FIGS. 1 and 9, the first, second, third, fourth, fifth, sixth, seventh and eighth display blocks of the display panel 400 may have first, second, third, fourth, fifth, sixth, seventh and eighth driving waveforms D_DB1, D_DB2, D_DB3, D_DB4, D_DB5, D_DB6, D_DB7 and D_DB8 according to the forward direction scan mode.

Referring to the first to eighth driving waveforms D_DB1, D_DB2, D_DB3, D_DB4, D_DB5, D_DB6, D_DB7 and D_DB8, the data voltage of the left-eye data frame L is sequentially provided to the first display block to the eighth display block during the first period T1. The data voltage of the left-eye data frame L may be provided to the display blocks of the display panel 400 at timings arranged along a first slope line TL1 having the first positive slope angle.

During the second period T2, the data driving part 510 does not provide the data voltage to the display panel 400. For example, the data voltage may be blocked from application to data lines of the display panel 400 by deactivating the gate signals. In an exemplary embodiment, the second period T2 is the substantially same as a period during which the data voltage of the left-eye data frame L is provided to the first display block to the eighth display block. For example, the second period T2 is the substantially same as the first period T1.

During the third period T3, the black data voltage B is provided to the first to eighth display blocks at the same time. The third period T3 may be equal to or more than a horizontal period during which one horizontal line of the display panel 400 is driven. For example, during the third period T3, the data driving part 510 outputs the black data voltage to the display panel 400 and the gate driving part 530 outputs the gate signal having the same pulse to the first to m-th gate lines of the display panel 400 at the same time. Thus, the black data voltage may be provided to the display blocks of the display panel 400 at the same time during the third period T3. The black data voltage is provided to the display panel 400 at timings arranged along the second slope line TL2 which is substantially vertical.

Before the black data voltage is provided to the display panel 400 at the same time, the data voltage is not provided to the display panel 400 during the second period T2. Thus, the first to eighth display blocks have first to eighth holding periods h1, h2, ..., h8 which are gradually decreased along the forward direction. Then, the black data voltage is provided to the first to eighth display blocks of the display panel 400 at the same time during the third period T3.

The first to eighth holding periods h1, h2, ..., h8 are included within the image period ON of the light source driving signal LDS, so that the luminance of the upper area UA may be increased. Therefore, the luminance of the left-eye frame image corresponding to the left-eye data may be increased.

In addition, the data voltage of the right-eye data frame R is sequentially provided to the first display block to the eighth display block during the fourth period T4. The data voltage of the right-eye data frame R may be provided to the display blocks of the display panel 400 at timings arranged along a third slope line TL3 having the first positive slope angle.

During the fifth period T5, the data driving part 510 does not provide the data voltage to the display panel 400. In an exemplary embodiment, the fifth period T5 is substantially the same as a period during which the data voltage of the right-eye data frame R is provided to the first display block to the eighth display block.

During the sixth period T6, the black data voltage B is provided to the first to eighth display blocks at the same time. The sixth period T6 may be equal to or more than a horizontal period during which one horizontal line of the display panel 400 is driven. For example, during the sixth period T6, the data driving part 510 outputs the black data voltage to the display panel 400 and the gate driving part 530 outputs the gate signal having the same pulse to the first to m-th gate lines of the display panel 400 at the same time. Thus, the black data voltage may be provided to the display blocks of the display panel 400 at the same time during the sixth period T6. The black data voltage is provided to the display panel 400 at timings arranged along the fourth slope line TL4 which is substantially vertical.

Before the black data voltage is provided to the display panel 400 at the same time, the data voltage is not provided to the display panel 400 during the fifth period T5. Thus, the first to eighth display blocks have first to eighth holding periods h1, h2, ..., h8 which are gradually decreased along the forward direction. Then, the black data voltage is provided to the first to eighth display blocks of the display panel 400 at the same time during the sixth period T6.

The first to eighth holding periods h1, h2, ..., h8 are included within the image period ON of the light source driving signal LDS, so that the luminance of the right-eye frame image corresponding to the right-eye data may be increased.

According to the second slope line TL2 corresponding to the timings at which the black data voltage is provided to the display panel 400 and the third slope line TL3 corresponding to the timings at which the data voltage of the right-eye data frame is provided to the display panel 400, the period during which the black data voltage is provided to the display panel 400 is gradually increased from the first display block to the eighth display block. Therefore, the display panel 400 displays a gradually changing black image.

The gradually changing black image has black-grayscale differences between the upper area UA, middle area MA and the lower area LA of the display panel 400. Thus, the gradually changing black image is inserted between the left-eye frame image and the right-eye frame image, so that the left-eye frame image and the right-eye frame image may have the grayscale differences.

According an exemplary embodiment, the timing control part 200 may include the data correcting part 210 which corrects the grayscale differences between the upper area UA, middle area MA and the lower area LA included in the left-eye and right-eye frame images, as described in FIG. 4.

According to an exemplary embodiment, the data voltage is not provided to the display panel during a predetermined period and the data voltage provided previously is maintained, so that the luminance of the 3D image may be increased. In addition, the black frame image is inserted between the left-eye frame image and the right-eye frame image, so that the crosstalk of the 3D image may be reduced or prevented.

Figure 10:
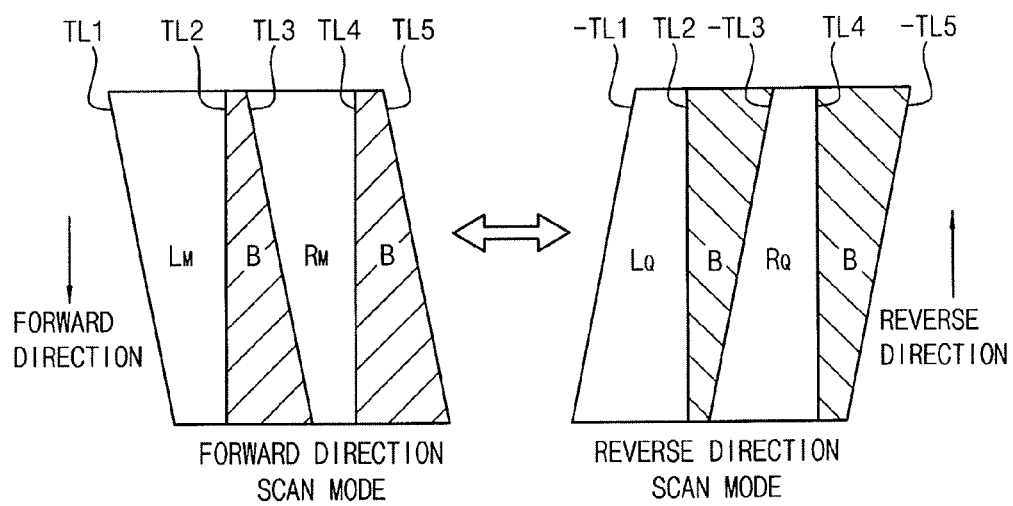
FIG. 10 is a conceptual diagram illustrating a method of driving a display panel according to an exemplary embodiment of the present invention.
Figure 11:
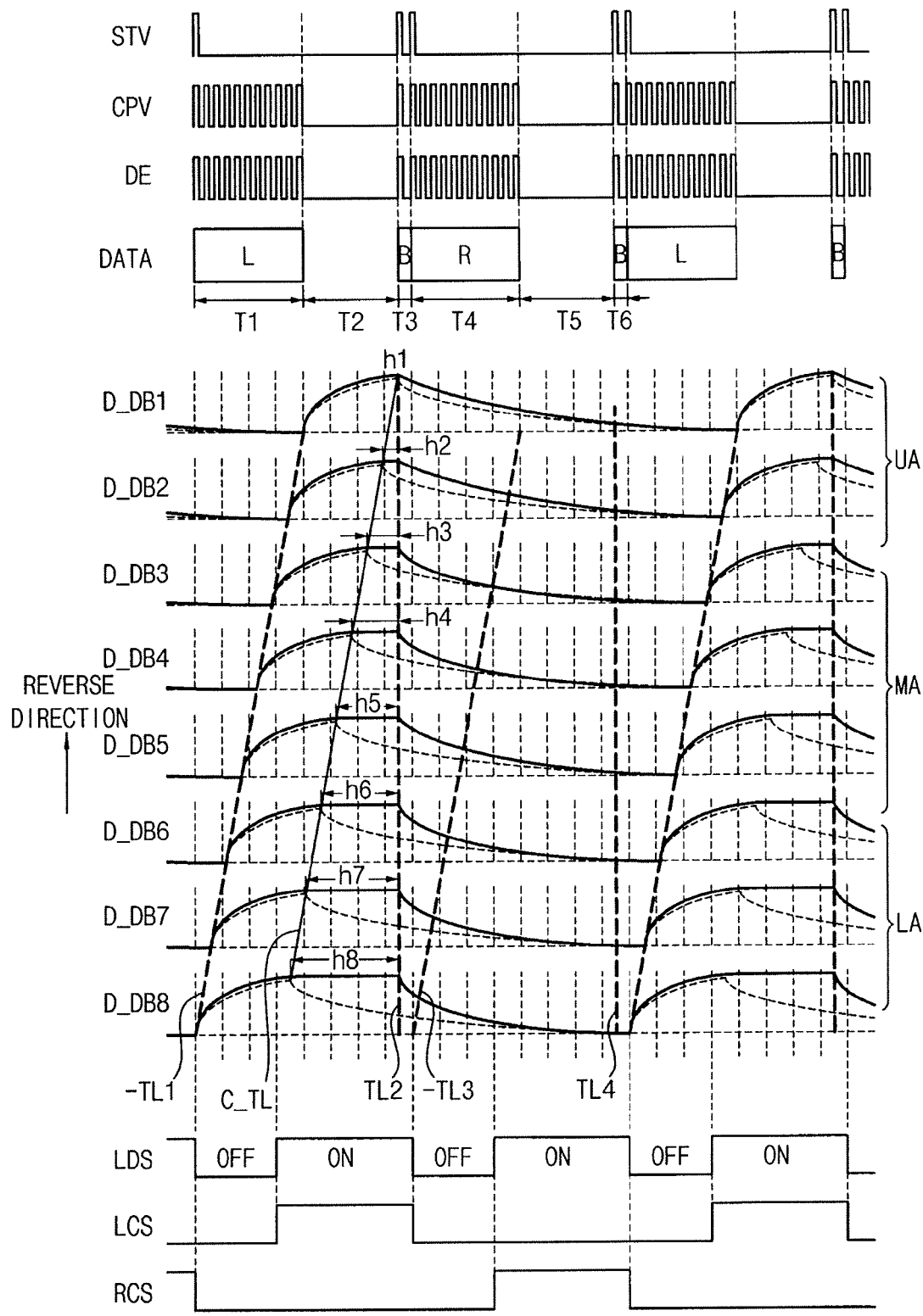
FIG. 11 is a waveform diagram illustrating a method of driving the display panel of FIG. 10 according to an exemplary embodiment of the present invention.

FIG. 10 is a conceptual diagram illustrating a method of driving a display panel according to an exemplary embodiment of the present invention. FIG. 11 is a waveform diagram illustrating a method of driving the display panel of FIG. 10.

Referring to FIGS. 10 and 11, the method of driving the display panel according to an exemplary embodiment includes a method of alternatively driving a forward direction scan mode and a reverse direction scan mode.

The timing control part 200 controls the panel driving part 500 to drive the display panel 400 with the forward direction scan mode. The panel driving part 500 displays an M-th left-eye data frame LM and an M-th right-eye data frame RM corresponding to an M-th source image data (e.g., M is a natural number) on the display panel 400 according to the scanning direction of the forward direction.

The M-th left-eye data frame LM is provided to the display panel 400 during a period defined by the first slope line TL1 and the second slope line TL2, and the black data voltage is provided to the display panel 400 during a period defined by the second slope line TL2 and the third slope line TL3. In addition, the M-th right-eye data frame RM is provided to the display panel 400 during a period defined by a third slope line TL3 substantially parallel to the first slope line TL1 and a fourth slope line TL4 substantially parallel to the second slope line TL2, and the black data voltage is provided to the display panel 400 during a period defined by the fourth slope line TL4 and a fifth slope line TL5 substantially parallel to the third slope line TL3.

As shown in FIG. 10, the period during which the black data voltage B is provided to the display panel 400 may be increased from the upper area of the display panel 400 toward the lower area of the display panel 400 along the forward direction.

Then, the timing control part 200 controls the panel driving part 500 to drive the display panel 400 with the reverse direction scan mode. The panel driving part 500 displays a Q-th left-eye data frame LQ and a Q-th right-eye data frame RQ corresponding to a Q-th source image data (e.g., Q is a natural number) on the display panel 400 according to the scanning direction of the reverse direction.

Referring to the first to eighth driving waveforms D_DB1, D_DB2, D_DB3, D_DB4, D_DB5, D_DB6, D_DB7 and D_DB8 shown in FIG. 11, the data voltage of the left-eye data frame L is sequentially provided to the eighth display block to the first display block during the first period T1. The data voltage of the left-eye data frame L may be provided to the display blocks of the display panel 400 at timings arranged along a first negative slope line −TL1 having a first negative slope angle.

During the second period T2, the data driving part 510 does not provide the data voltage to the display panel 400. In an exemplary embodiment, the second period T2 is substantially the same as a period during which the data voltage of the left-eye data frame L is provided to the first display block to the eighth display block. For example, the second period T2 is substantially the same as the first period T1.

During the third period T3, the black data voltage B is provided to the first through eighth display blocks at the same time. The black data voltage may be provided to the display panel 400 at timings arranged along the second slope line TL2 which is substantially vertical. For example, the third period T3 may be equal to or more than a horizontal period during which one horizontal line of the display panel 400 is driven.

During the fourth period T4, the data voltage of the right-eye data frame R is sequentially provided to the eighth display block to the first display block. The data voltage of the right-eye data frame R may be provided to the display blocks of the display panel 400 at timings arranged along a third negative slope line −TL3.

During the fifth period T5, the data driving part 510 does not provide the data voltage to the display panel 400. In an exemplary embodiment, the second period T2 is substantially the same as a period during which the data voltage of the right-eye data frame R is provided to the first display block to the eighth display block. For example, the fifth period T5 is substantially the same as the fourth period T4.

During the sixth period T6, the black data voltage B is provided to the first to the eighth display blocks at the same time. The black data voltage may be provided to the display panel 400 at timings arranged along the fourth slope line TL4 which is substantially vertical. For example, the sixth period T6 may be equal to or more than a horizontal period during which one horizontal line of the display panel 400 is driven.

Referring to FIGS. 10 and 11, according to the reverse direction scan mode, the Q-th left-eye data frame LQ is provided to the display panel 400 during a period defined by the first negative slope line −TL1 and the second slope line TL2 such as the vertical line, and the black data voltage is provided to the display panel 400 during a period defined by the second slope line TL2 and the third negative slope line −TL3. In addition, the Q-th right-eye data frame RQ is provided to the display panel 400 during a period defined by a third negative slope line −TL3 and a fourth slope line TL4 which is substantially vertical, and the black data voltage is provided to the display panel 400 during a period defined by the fourth slope line TL4 and a fifth negative slope line −TL5.

The period B during which the black data voltage is provided to the display panel 400 in the forward direction scan mode and the period B during which the black data voltage is provided to the display panel 400 in the reverse direction scan mode, each has a bottom-top symmetrical structure. For example, the period B during which the black data voltage is provided to the display panel 400 in the forward direction scan mode may be gradually increased along the forward direction and the period B during which the black data voltage is provided to the display panel 400 in the reverse direction scan mode may be gradually decreased along the reverse direction.

Therefore, the black grayscale difference between the upper, middle and lower areas of the frame image in the forward direction scan mode and the black grayscale difference between the upper, middle and lower areas of the frame image in the reverse direction scan mode, may be offset with each other, so that the black grayscale difference may be removed.

According to an exemplary embodiment, the display panel 400 is alternatively driven with the forward direction scan mode and the reverse direction scan mode, so that the data correcting part described previously may be omitted and the black grayscale difference of the frame image may be removed.

According to an exemplary embodiment, the data voltage is not provided to the display panel during a predetermined period and the data voltage provided previously is maintained, so that the luminance of the 3D image may be increased. In addition, the black frame image is inserted between the left-eye frame image and the right-eye frame image, so that the crosstalk of the 3D image may be reduced or prevented.

Figure 12:
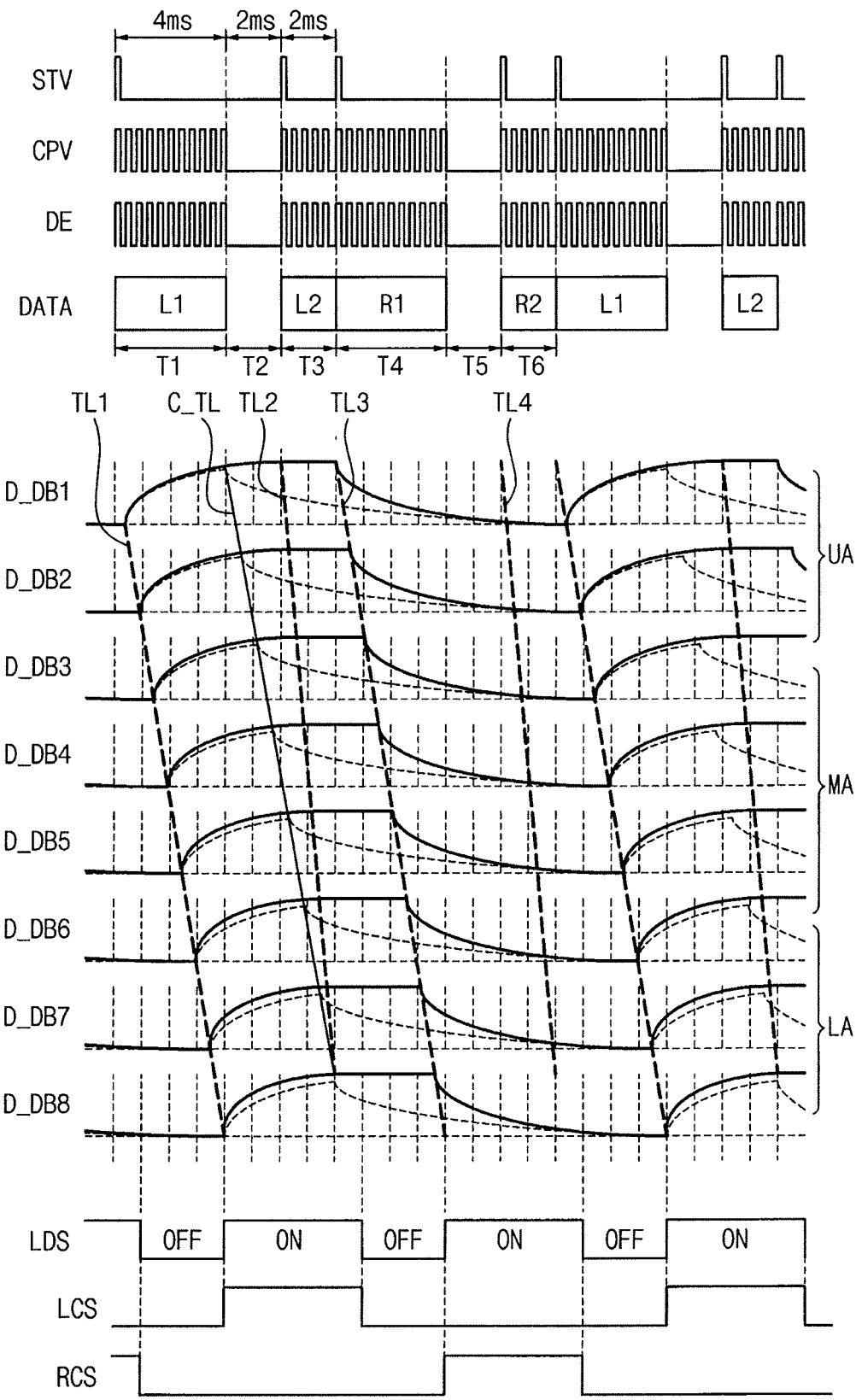
FIG. 12 is a waveform diagram illustrating a method of driving a display panel according to an exemplary embodiment of the present invention.

FIG. 12 is a waveform diagram illustrating a method of driving a display panel according to an exemplary embodiment of the present invention.

Referring to FIGS. 1 and 12, according to an exemplary embodiment, the panel driving part 500 sequentially outputs at least two first and second left-eye data frames L1 and L2 and at least two first and second right-eye data frames R1 and R2 received from the repeating part 300. The second left-eye data frame L2 may be substantially the same as the first left-eye data frame L1 and may be generated using the first left-eye data frame L1. The second right-eye data frame R2 may be substantially the same as the first right-eye data frame R1 and may be generated using the first right-eye data frame R1. Based on the data enable signal DE, the data driving part 510 outputs the data voltage of first left-eye data frame L1 to the display panel 400 during the first period T1, blocks the data voltage from being provided to the display panel 400 during the second period T2, and outputs the data voltage of the second left-eye data frame L2 to the display panel 400 during the third period T3. In addition, the data driving part 510 outputs the data voltage of first right-eye data frame R1 to the display panel 400 during the fourth period T4, blocks the data voltage from being provided to the display panel 400 during the fifth period T5, and outputs the data voltage of the second right-eye data frame R2 to the display panel 400 during the sixth period T6.

In an embodiment, the gate driving part 530 outputs the gate signal to the display panel 400 based on the vertical starting signal STV and the gate clock signal CPV. The vertical starting signal STV controls a start of driving the gate driving part 530. Thus, the vertical starting signal STV has a pulse at a beginning of each of the first period T1, the third period T3, the fourth period T4 and the sixth period T6 during which the data enable signal DE is activated. In an embodiment, the gate clock signal CPV controls a pulse period of each of the first to m-th gate signals. Thus, the gate clock signal CPV has a first horizontal period during the first and fourth periods T1 and T4 during which the data voltage of the first left-eye data frame or the first right-eye data frame is provided to the display panel 400, and has a second horizontal period different from the first horizontal period during the third and sixth periods T3 and T6 during which the data voltage of the second left-eye data frame or the second right-eye data frame is provided to the display panel 400.

In an embodiment, based on the vertical starting signal STV and the gate clock signal CPV, the gate driving part 530 sequentially outputs the first to m-th gate signals to the display panel 400 during the first period T1, blocks the first to m-th gate signals from being output to the display panel during the second period T2, and sequentially outputs the first to m-th gate signals to the display panel 400 during the third period T3. In addition, the gate driving part 530 sequentially outputs the first to m-th gate signals to the display panel 400 during fourth period T4, blocks the first to m-th gate signals from being output to the display panel 400 during the fifth period T5, and sequentially outputs the first to m-th gate signals to the display panel 400 during the sixth period T6.

In an embodiment, the first period T1 is greater than the third period T3 and is substantially the same as a sum of the second period T2 and the third period T3. The second period T2 may be substantially the same as the third period T3. In an embodiment, the fourth period T4 is greater than the sixth period T6 and is substantially the same as a sum of the fifth period T5 and the sixth period T6. The fifth period T5 may be substantially the same as the sixth period T6.

According to the control of the timing control part 200, the light source driving part 700 generates the light source driving signal LDS. In an embodiment, the light source driving signal LDS has a high level during an image period ON during which the light is generated and a low level during a black period OFF during which the light is blocked. According to the first to eighth driving waveforms D_DB1, D_DB8 of the first to eighth display blocks included in the display panel 400, the image period ON of the light source driving signal LDS corresponds to a period during which the display panel displays the left-eye frame image or the right-eye frame image, and the black period OFF of the light source driving signal LDS corresponds to a period during which the display panel displays a mixed image, which is a mixture of the left-eye frame image and the right-eye frame image.

Referring to the first to eighth driving waveforms D_DB1, D_DB2, D_DB3, D_DB4, D_DB5, D_DB6, D_DB7 and D_DB8, during the first period T1, the data voltage of the first left-eye data frame L1 is sequentially provided to the first to eighth display blocks. Timings at which the data voltage of the first left-eye data frame L1 is provided to the first to eighth display blocks, may be arranged along a first slope line TL1 having a first slope angle. During the second period T2, the data driving part 510 does not provide the data voltage to the first to eighth display blocks of the display panel 400. Thus, the first to eighth display blocks maintain the data voltage of the first left-eye data frame L1 provided during the first period T1.

During the third period T3, the data voltage of the second left-eye data frame L2 is sequentially provided to the first to eighth display blocks. Timings at which the black data voltage is provided to the first to eighth display blocks, may be arranged along a second slope line TL2 having a second slope angle different from the first slope angle.

In addition, during the fourth period T4, the data voltage of the first right-eye data frame R1 is sequentially provided to the first to eighth display blocks. Timings at which the data voltage of the first right-eye data frame is provided to the first to eighth display blocks, may be arranged along a third slope line TL3 having the first slope angle.

During the fifth period T5, the data driving part 510 does not provide the data voltage to the first to eighth display blocks. Thus, the first to eighth display blocks maintain the data voltage of the first right-eye data frame R2 provided during the fourth period T4.

During the sixth period T6, the data voltage of the second right-eye data frame R2 is sequentially provided to the first to eighth display blocks. Timings at which the black data voltage is provided to the first to eighth display blocks, may be arranged along a fourth slope line TL4 having the second slope angle.

Based on the first to eighth driving waveforms D_DB1, . . . , D_DB8 of the display panel 400, the light source driving signal LDS has a high level during the image period ON during which the display panel 400 displays the left-eye frame image or the right-eye frame image. In addition, the light source driving signal LDS has a low level during the black period OFF during which the display panel displays the mixed image in which the left-eye frame image and the right-eye frame image are mixed.

Thus, the light source part 600 provides the light to the display panel 400 during the period in which the display panel 400 displays the left-eye frame image or the right-eye frame image. The light source part 600 blocks the light from being provided to the display panel 400 during the period in which the display panel 400 displays the mixed image, so that the crosstalk of the 3D image may be reduced or prevented.

Figure 13:
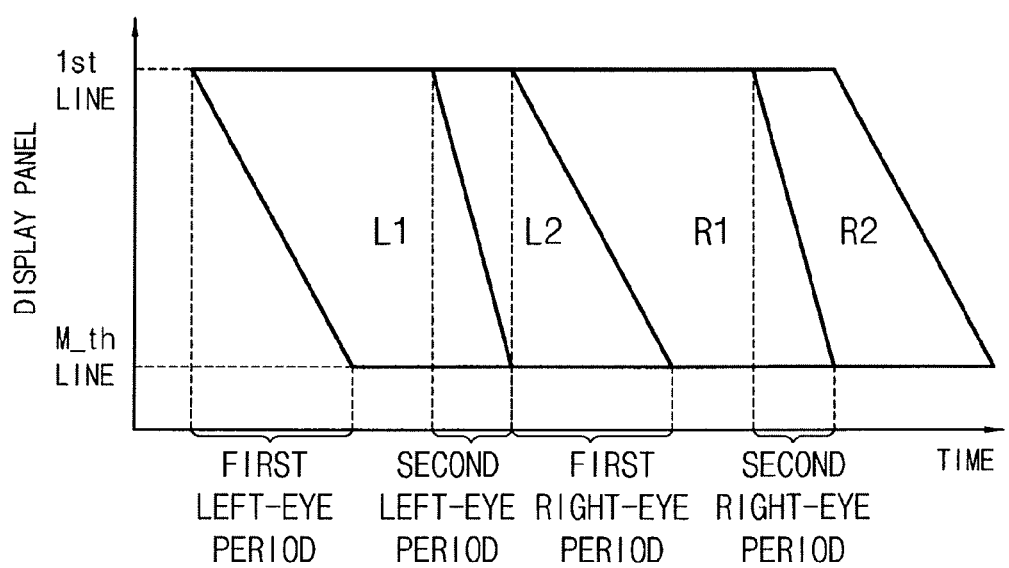
FIG. 13 is a conceptual diagram illustrating a method of driving a display panel according to an exemplary embodiment of the present invention.

FIG. 13 is a conceptual diagram illustrating a method of driving a display panel according to an exemplary embodiment of the present invention.

Referring to FIG. 13, a first left-eye period during which the data voltage of the first left-eye data frame L1 is provided to the display panel 400 may be different from a second left-eye period during which the data voltage of the second left-eye data frame L2 is provided to the display panel 400. The first left-eye period may be greater than the second left-eye period. In addition, a first right-eye period during which the data voltage of the first right-eye data frame R1 is provided to the display panel 400 may be different from a second right-eye period during which the data voltage of the second right-eye data frame R2 is provided to the display panel 400. The first right-eye period may be longer than the second right-eye period. In an embodiment, the display panel 400 receives the data voltages of the first left-eye data frame L1, the second left-eye data frame L2, the first right-eye data frame R1 and the second right-eye data frame R2, so that shapes of holding periods during which the data voltages L1, L2, R1, and R2 are maintained in the display panel 400 are substantially the same as shown in FIG. 13.

Referring to FIG. 13, holding periods respectively corresponding to the data voltages of the first left-eye data frame L1 and the first right-eye data frames R1 may be gradually decreased from the upper area of the display panel 400 toward the lower area of the display panel 400. As shown in FIG. 13, a holding period corresponding to a first horizontal line 1st LINE of the display panel 400 may be the longest and a holding period corresponding to a last horizontal line M-th LINE of the display panel 400 may be the shortest.

In addition, holding periods respectively corresponding to the data voltages of the second left-eye data frame L2 and the second right-eye data frames R2 may be gradually increased from the upper area of the display panel 400 toward the lower area of the display panel 400. As shown in FIG. 13, a holding period corresponding to a first horizontal line 1st LINE of the display panel 400 may be the shortest and a holding period corresponding to a last horizontal line M-th LINE of the display panel 400 may be the longest.

The data voltage of the second left-eye data frame L2 may be substantially the same as the data voltage of the first left-eye data frame L1, or may be generated using the first left-eye data frame L1.

In addition, the data voltage of the second right-eye data frame R2 may be substantially the same as the data voltage of the first right-eye data frame R1, or may be generated using the first right-eye data frame R1.

According to an exemplary embodiment, the data voltage is not provided to the display panel during a predetermined period and the data voltage provided previously is maintained, so that the luminance of the 3D image may be increased. In addition, the data voltage of the 3D image data is blocked from the display panel 400 during the predetermined period, so that power consumption may be decreased.

Although not shown in the figures, the data voltage of the left-eye data frame may be provided to the display panel 400 during a K-th frame (e.g., K is a natural number), the data voltage may be blocked from the display panel 400 during a (K+1)-th frame, the data voltage of the right-eye data frame may be provided to the display panel 400 during a (K+2)-th frame and the data voltage may be blocked from the display panel 400 during a (K+3)-th frame. In this example, the data voltage may be blocked from the display panel 400 during two frames, so that the power consumption may be decreased.

The foregoing is illustrative of the present invention and is not to be construed as limiting thereof. Although exemplary embodiments of the present invention have been described, many modifications can be made in the exemplary embodiments without departing from the present invention. Accordingly, all such modifications are intended to be included within the scope of the present invention.

What is claimed is:

1. A method of driving a display panel, the method comprising:
    outputting a data voltage of three-dimensional ("3D") image data included in a left-eye data frame and a right-eye data frame sequentially to horizontal lines of the display panel along a scanning direction of a first direction during a first period;
    blocking a data voltage from being provided to all the horizontal lines of the display panel during a second period after the first period; and
    outputting a black data voltage to the horizontal lines of the display panel during a third period that is less than the first period:
    wherein the first period is equal to a sum of the second period and the third period, and the third period is equal to or less than the second period, and the third period occurs after the second period.

2. The method of claim 1, wherein the data voltage of the 3D image data is maintained during a holding period before which the black data voltage is output to the display panel, and the holding period is gradually decreased along the scanning direction.

3. The method of claim 2, further comprising:
    providing a light to the display panel during an image period in which an image corresponding to the 3D image data is displayed on the display panel; and
    blocking the light from the display panel during a block period in which a black image corresponding to the black data voltage is displayed on the display panel, wherein the image period includes the holding period.

4. The method of claim 2, wherein a period during which the black data voltage is provided to the display panel, is gradually increased along the scanning direction.

5. The method of claim 4, further comprising: correcting the 3D image data using a plurality of look-up tables ("LUTs"), and each LUT is preset corresponding to one of a plurality of distinct regions of the display panel arranged along the scanning direction.

6. The method of claim 1, further comprising:
    outputting the data voltage of the 3D image data to the display panel along a scanning direction of a second direction opposite to the first direction during a fourth period;
    blocking the data voltage from being provided to the display panel during a fifth period; and
    outputting the black data voltage to the display panel during a sixth period that is less than the fourth period.

7. The method of claim 1, wherein outputting the data voltage of the 3D image data comprises: sequentially outputting a gate signal having a first pulse to a plurality of gate lines included in the display panel along the scanning direction.

8. The method of claim 7, wherein outputting the black data voltage to the display panel comprises: sequentially outputting a gate signal having a second pulse of a width less than or equal to that of the first pulse to the gate lines along the scanning direction.

9. The method of claim 7, wherein outputting the black data voltage to the display panel comprises: outputting a gate signal having a third pulse to the gate lines at the same time.

10. A method of driving a display panel, the method comprising:
    outputting a data voltage of a first left-eye data frame or a first right-eye data frame sequentially to horizontal lines of the display panel during a first period;
    sequentially outputting a gate signal having a first pulse to a plurality of gate lines included in the display panel;
    blocking a data voltage from being output to all the horizontal lines of the display panel during a second period after the first period;
    outputting a data voltage of a second left-eye data frame that repeats the first left-eye data frame when the data voltage of the first left-eye data frame is output during the first period or a data voltage of a second right eye data frame that repeats the first right-eye data frame when the data voltage of the first right-eye data frame is output during the first period, sequentially to the horizontal lines of the display panel during a third period that is less than the first period; and
    sequentially outputting a gate signal having a second pulse to the gate lines;
    wherein the first period is equal to a sum of the second period and the third period and the third period is equal to or less than the second period, and the third period occurs after the second period.

11. The method of claim 10, wherein the second pulse has a width that is less than that of the first pulse.

12. The method of claim 10, wherein the second pulse has a width equal to that of the first pulse and is sequentially provided to at least two gate lines adjacent each other.

13. A display apparatus comprising: a display panel; and a data driving part configured to output a data voltage of three-dimensional ("3D") image data included in a left-eye data frame and a right-eye data frame sequentially to horizontal lines of the display panel along a scanning direction of a first direction during a first period, block a data voltage from being provided to all the horizontal lines of the display panel during a second period after the first period, and output a black data voltage to the horizontal lines of the display panel during a third period that is less than the first period,
    wherein the first period is equal to a sum of the second period and the third period, and the third period is equal to or less than the second period, and the third period occurs after the second period.

14. The display apparatus of claim 13, wherein the data voltage of the 3D image data is maintained during a holding period before which the black data voltage is output to the display panel, and the holding period is gradually decreased along the scanning direction.

15. The display apparatus of claim 14, further comprising: a light source part configured to provide a light to the display panel during an image period in which an image corresponding to the 3D image data is displayed on the display panel, and block the light from the display panel during a block period in which a black image corresponding to the black data voltage is displayed on the display panel, wherein the image period includes the holding period.

16. The display apparatus of claim 14, further comprising: a data correcting part configured to correct the 3D image data using a plurality of look-up tables ("LUTs") preset corresponding to a plurality of distinct regions of the display panel arranged along the scanning direction.

17. The display apparatus of claim 14, wherein the data driving part is configured to output the data voltage of the 3D image data to the display panel along the scanning direction of a second direction opposite to the first direction during a fourth period, block the data voltage from being provided to the display panel during a fifth period, and output the black data voltage to the display panel during a sixth period that is less than the fourth period.

18. The display apparatus of claim 14, further comprising: a gate driving part configured to sequentially output a gate signal having a first pulse to a plurality of gate lines included in the display panel along the scanning direction during the first period.

19. The display apparatus of claim 18, wherein the gate driving part is configured to sequentially output a gate signal having a second pulse of a width less than or equal to that of the first pulse to the gate lines along the scanning direction during the third period.

20. The display apparatus of claim 18, wherein the gate driving part is configured to output a gate signal having a third pulse to the gate lines at the same time during the third period.

21. A display apparatus comprising:
a display panel configured to display one of a left-eye frame image, a right-eye frame image and a refresh frame image,
wherein left-eye frame image data corresponding to the left-eye frame image or right-eye frame image data corresponding to the right-eye frame image are provided sequentially to horizontal lines of the display panel during a first period, a data voltage is blocked from being provided to all the horizontal lines of the display panel during a second period after the first period, and refresh frame image data corresponding to the refresh frame image are provided to the horizontal lines of the display panel during a third period that is less than the first period, wherein the first period is equal to a sum of the second period and the third period, and the third period is equal to or less than the second period, and the third period occurs after the second period.

22. The display apparatus of claim 21, further comprising: a glasses part including a left-eye part transmitting the left-eye frame image and blocking the right-eye frame image, and a right-eye part transmitting the right-eye frame image and blocking the left-eye frame image.

23. The display apparatus of claim 21, wherein the refresh frame image data is black frame image data corresponding to a black frame image.

24. The display apparatus of claim 23, wherein the black frame image data is provided to a plurality of horizontal lines of the display panel at the same time.

25. The display apparatus of claim 21, wherein the refresh frame image data is substantially the same as the left-eye frame image data provided to the display panel just before the refresh frame image data is provided to the display panel, or a second left-eye frame image data which is generated using the left-eye frame image data provided to the display panel just before the refresh frame image data is provided to the display panel.

26. The display apparatus of claim 21, wherein the refresh frame image data is substantially the same as the right-eye frame image data provided to the display panel just before the refresh frame image data is provided to the display panel, or a second right-eye frame image data which is generated using the right-eye frame image data provided to the display panel just before the refresh frame image data is provided to the display panel.

27. The display apparatus of claim 21, wherein first 3D image data including the left-eye frame image data and the right-eye frame image data is provided to the display panel in a first scanning direction and second 3D including the left-eye frame image data and the right-eye frame image data is sequentially applied to the display panel in a second other scanning direction.

28. The display apparatus of claim 21, further comprising: a polarization panel configured to change the left-eye frame image and the right-eye frame image displayed on the display panel into polarization lights different from each other.

29. The display apparatus of claim 21, further comprising: a data correcting part configured to correct the 3D image data using a plurality of look-up tables ("LUTs") preset corresponding to a plurality of distinct regions of the display panel arranged along a scanning direction.

30. The display apparatus of claim 29, wherein each of the LUTs generates correction data using image data of frames adjacent each other.

31. A display apparatus for displaying three-dimensional images, the apparatus comprising:
a display panel including a plurality of pixels, gates lines, and data lines; and a timing control part configured to sequentially apply a data voltage of a left-eye image to the data lines during a first period, block application of a data voltage to the data lines during a second period after the first period, apply a black voltage of a black image to the data lines during a third period, and apply a data voltage of a right-eye image to the data lines,
wherein the timing control part adjusts a width of the third period in which the black voltage is applied to each subsequent row of the pixels to be larger than or smaller than a width of the third period in which the black voltage is applied to a prior one of the rows
wherein the first period is equal to a sum of the second period and the third period, and the third period is equal to or less than the second period, and the third period occurs after the second period.

* * * * *